(12) United States Patent
Akiyama

(10) Patent No.: US 7,819,534 B2
(45) Date of Patent: Oct. 26, 2010

(54) PROJECTOR AND METHOD FOR MANUFACTURING PROJECTOR

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 11/462,881

(22) Filed: Aug. 7, 2006

(65) Prior Publication Data

US 2007/0035704 A1 Feb. 15, 2007

(30) Foreign Application Priority Data

Aug. 10, 2005 (JP) ............................ 2005-231708
May 12, 2006 (JP) ............................ 2006-133593

(51) Int. Cl.
*G03B 3/00* (2006.01)
(52) U.S. Cl. ........................................ 353/102; 353/38
(58) Field of Classification Search .................. 353/10, 353/382; 359/672–675; 350/423
See application file for complete search history.

(56) References Cited

U.S. PATENT DOCUMENTS

| | | | | |
|---|---|---|---|---|
| 5,035,492 | A * | 7/1991 | Ito ............................... | 359/676 |
| 6,457,829 | B1 * | 10/2002 | Nakazawa et al. ............. | 353/31 |
| 6,863,419 | B2 * | 3/2005 | Kodama et al. .............. | 362/268 |
| 7,040,768 | B2 * | 5/2006 | Fujisawa et al. .............. | 353/99 |
| 2003/0025883 | A1 * | 2/2003 | Yajima ......................... | 353/38 |
| 2005/0157501 | A1 | 7/2005 | Akiyama et al. | |

FOREIGN PATENT DOCUMENTS

| | | |
|---|---|---|
| JP | A 8-304739 | 11/1996 |
| JP | A-2002-055208 | 2/2002 |
| JP | A-2002-162596 | 6/2002 |
| JP | A-2005-208132 | 8/2005 |
| WO | WO 2005/036256 A1 | 4/2005 |

OTHER PUBLICATIONS

Hecht, Optics, Copyright 2002, Addison Wesley, 1301, fourth edition, p. 168.*

* cited by examiner

*Primary Examiner*—Georgia Y Epps
*Assistant Examiner*—Jerry Brooks
(74) *Attorney, Agent, or Firm*—Oliff & Berridge, PLC

(57) ABSTRACT

A projector includes: a light source that emits an illumination flux; a first lens array having plural first small lenses that split the illumination flux from the light source into plural partial luminous fluxes; a second lens array having plural second small lenses corresponding to the plural first small lenses; a superimposing lens that superimposes each partial luminous flux from the second lens array onto an illuminated area; an electro-optic modulator that modulates the light superimposed by the superimposing lens in accordance with image information; and a projection system that projects the light modulated by the electro-optic modulator; wherein the projector further has an optical lens arranged in an optical path between the superimposing lens and the electro-optic modulator, and the optical lens, together with the superimposing lens, forms a superimposing system that has a different focal length from the focal length of the superimposing lens and that has substantially the same focal position as the focal position of the superimposing lens.

20 Claims, 7 Drawing Sheets

F I G. 5
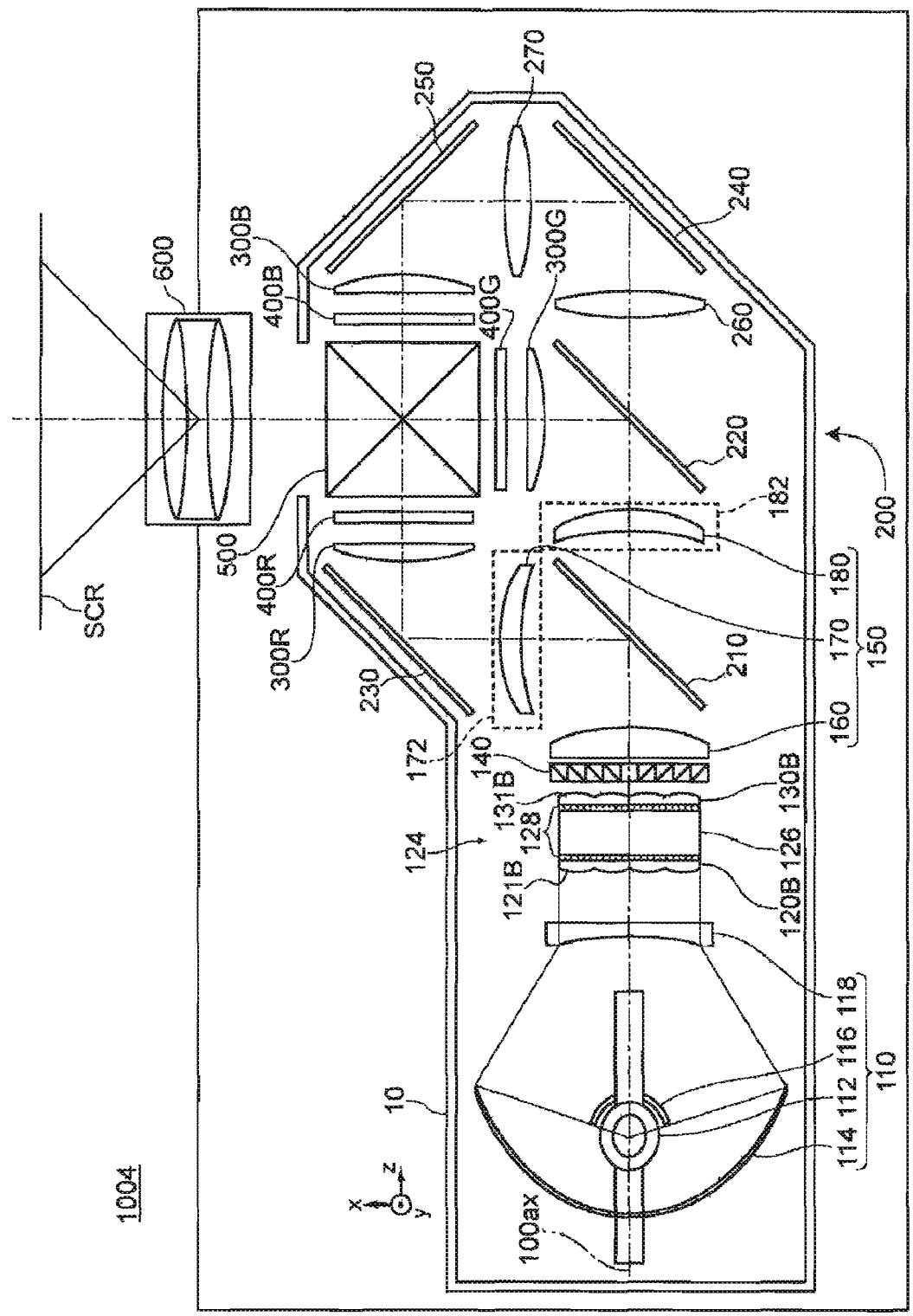

F I G. 7
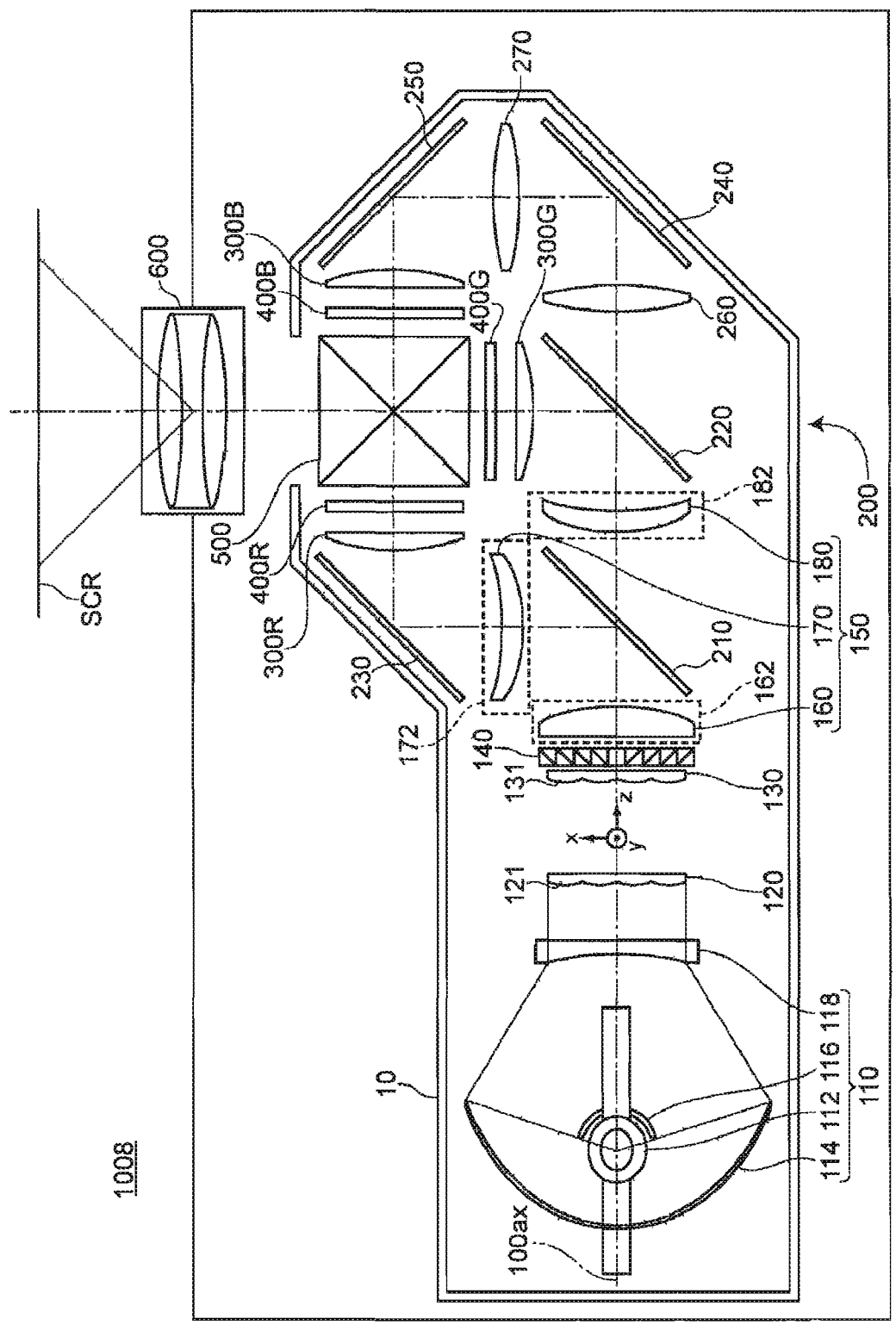

PROJECTOR AND METHOD FOR MANUFACTURING PROJECTOR

This application claims priority from Japanese Patent Application Nos. 2005-231708 and 2006-133593, the entire disclosures of which are hereby incorporated by reference in their entireties.

BACKGROUND

1. Technical Field

This invention relates to a projector and a method for manufacturing a projector.

2. Related Art

Traditionally, a projector having a first lens array, a second lens array and a superimposing lens as a light equalizing system has been known, for example, as disclosed in JP-A-8-304739 (FIG. 11). In the traditional projector, since light having relatively uneven in-plane light intensity distribution emitted from a light source is converted to light having relatively even in-plane light intensity distribution by the function of the first lens array, the second lens array and the superimposing lens as the light equalizing system, such light having relatively even in-plane light intensity distribution can be cast to an image forming area in a liquid crystal device as an electro-optic modulator, which is an illumination target.

However, the traditional projector has the following two problems.

First Problem

In the projector, if an image forming area in the electro-optic modulator cannot be accurately illuminated, the brightness of a projected image projected on a projection surface is lowered or the edge of the projected image is shaded. Thus, in consideration of the dimensional error, mounting accuracy and the like or optical elements themselves in an illumination system and a color separation light guiding system, a predetermined illumination margin is provided around an illumination area of illuminating light cast to the image forming area. The design is made so that the image forming area in the electro-optic modulator securely falls within the range of the illumination area including the illumination margin.

Meanwhile, it is preferable that the size of such an illumination margin is as small as possible. This is because, if the size of the illumination area including the illumination margin is increased unnecessarily with respect to the image forming area, the illuminance in the image forming area is lowered accordingly and the brightness of the projected image protected on the projection surface is lowered. To minimize the size of the illumination margin and match the illumination area with the image forming area, the size of the illumination area must be adjusted.

Traditionally, when adjusting the size of the illumination area, for example, the position of each optical element (for example, first lens array, second lens array, superimposing lens and the like) in the illumination system is adjusted and the size of the illumination area is thus adjusted. However, such work requires much time and labor. Therefore, the traditional projector has a problem that it is not easy to adjust the size of the illumination area.

Second Problem

Recently, in order to reduce the cost of the projector, miniaturization of the electro-optic modulator is highly demanded. If the electro-optic modulator is miniaturized, the size of the image forming area is reduced, too. Therefore, the size of the illumination area must be reduced in accordance with the size of the image forming area.

Here, the size of the illumination area is calculated by multiplying the size of first small lenses of the first lens array by the ratio of the focal length $f2$ of the superimposing lens to the focal length $f1$ of second small lenses of the second lens array ($=f2/f1$ (magnification)). Therefore, in order to reduce the size of the illumination area, the size of the first small lenses must be reduced or the focal length $f2$ of the superimposing lens must be reduced, or the focal length of the second small lenses must be increased.

However, in order to reduce the size of the first small lenses, the first lens array must be changed to a first lens array in which each small lens has a reduced size. In order to reduce the focal length $f2$ of the superimposing lens, the size of the color separation light guiding system must be reduced in order to increase the focal length $f1$ of the second small lenses, the size of the illumination system must be increased. That is, in order to reduce the size of the illumination area, the illumination system (including the first lens array) or the color separation light guiding system must be changed.

Therefore, the traditional projector has a problem that, if the electro-optic modulator is miniaturized, the illumination system or the color separation light guiding system before the change of the electro-optic modulator cannot be used as it is.

This problem occurs not only when the electro-optic modulator is miniaturized but also when the electro-optic modulator is increased in size.

That is, the traditional projector has a problem that, if the size of the electro-optic modulator is changed, the illumination system or the color separation light guiding system before the change of the electro-optic modulator cannot be used as it is. As a result, the illumination system or the color separation light guiding system must be redesigned. Therefore, the number of processes increases because of the redesign and the manufacturing cost of the projector increases.

SUMMARY

An advantage of some aspects of the invention is to provide a projector in which the size of the illumination area can be adjusted easily or in which even if the size of the electro-optic modulator is changed, the illumination system or the color separation light guiding system before the change of the electro-optic modulator can be used as it is. Another advantage of some aspects of the invention is to provide a method for manufacturing such an excellent projector.

A projector according to a first aspect of the invention includes: a light source that emits illumination flux; a first lens array having plural first small lenses that split the illumination flux from the light source into plural partial luminous fluxes; a second lens array having plural second small lenses corresponding to the plural first small lenses; a superimposing lens that superimposes each partial luminous flux from the second lens array onto an illuminated area; an electro-optic modulator that modulates the light superimposed by the superimposing lens in accordance with image information; and a projection system that projects the light modulated by the electro-optic modulator. The projector further includes an optical lens arranged in an optical path between the superimposing lens and the electro-optic modulator. The optical lens, together with the superimposing lens, forms a superimposing system that has a different focal length from the focal length of the superimposing lens and that has substantially the same focal position as the focal position of the superimposing lens.

Thus, in the projector according to the first aspect of the invention, the superimposing system that has substantially the same focal position as the focal position of the superimposing system formed only by the superimposing lens and that has a different focal length from the focal length of the superimposing system formed only by the superimposing lens, can be formed by the superimposing lens and the optical lens. Therefore, the superimposing system can be an optical system having a function that enables change of the size of an illumination area without changing an image forming position in the illumination area. In short since optical lens that is to form the superimposing system having a different focal length from the focal length of the superimposing lens is arranged at a predetermined position in the optical path, the size of the illumination area can be adjusted by adjusting the focal length of the superimposing system formed by the superimposing lens and the optical lens.

In this case, the size of the illumination area is calculated by multiplying the size of the first small lenses of the first lens array by the ratio of the focal length f3 of the superimposing system to the focal length f1 of second small lenses of the second lens array (=f3/f1 (magnification)). Therefore, in the projector according to the first aspect of the invention, the size of the illumination area can be adjusted to a proper size by arranging a proper optical lens in the optical path and fixing the optical lens by an optical lens fixing device.

Also, in the projector according to the first aspect of the invention, the focal position of the superimposing system formed only by the superimposing lens with no optical lens arranged in the optical path, and the focal position of the superimposing system formed by the superimposing lens and the optical lens with the optical lens arranged in the optical path, can be made substantially the same. Therefore, even when the optical lens is arranged in the optical path, illuminating light having no defocus and having relatively even in-plane light intensity distribution is cast to the image forming area in each electro-optic modulator.

Moreover, in the projector according to the first aspect of the invention, the size of the illumination area can be adjusted by the very simple construction of arranging the optical lens in the optical path.

Also in the case where the size of the electro-optic modulator is changed, in the projector according to the first aspect of the invention, for the same reason as described above, the optical lens that is to form the superimposing system having a different focal length from the focal length of the superimposing lens when arranged in the optical path can be arranged in the optical path to adjust the focal length of the superimposing system formed by the superimposing lens and the optical lens. As a result, the size of the illumination area can be adjusted.

Also, in the projector according to the first aspect of the invention, since the proper optical lens is arranged in the optical path, the size of the illumination area can be adjusted by adjusting the focal length f3 of the superimposing system formed by the superimposing lens and the optical lens. Therefore, the size of the first small lenses and the focal length f1 of the second small lenses need not be adjusted for adjusting the size of the illumination area. Thus, even when the size of the electro-optic modulator is changed, the illumination system before the change of the electro-optic modulator can be used as it is.

In this manner, in the projector according to the first aspect of the invention, since the illumination system before the change of the electro-optic modulator can be used as it is even when the size of the electro-optic modulator is changed, the illumination system need not be redesigned and the number of processes can be reduced. Therefore, increase in the manufacturing cost of the projector can be restrained.

Thus, the projector according to the first aspect of the invention is a projector in which the size of the illumination area can be adjusted easily, or a projector in which even when the size of the electro-optic modulator is changed, the illumination system before the chance of the electro-optic modulator can be used as it is.

It is preferable that the projector according to the first aspect of the invention has: a color separation light guiding system having a first dichroic mirror that separates the light from the superimposing lens into first color light on one hand and second color light and third color light on the other, and a second dichroic mirror that separates the second color light and the third color light from the first dichroic mirror to the second color light and the third color light; first to third electro-optic modulators that modulate the first to third color lights, respectively, as the electro-optic modulator; a light combining system that combines the color lights modulated by the first to third electro-optic modulator and emits the combined light to the projection system; and a first optical lens arranged between the first dichroic mirror and the first electro-optic modulator, and a second optical lens arranged between the first dichroic mirror and the second dichroic mirror, as the optical lens; wherein the first optical lens, together with the superimposing lens, forms a first superimposing system having a different focal length from the focal length of the superimposing lens and having substantially the same focal position as the focal position of the superimposing lens, whereas the second optical lens, together with the superimposing lens, forms a second superimposing system having a different focal length from the focal length of the superimposing lens and having substantially the same focal position as the focal position of the superimposing lens.

Thus, since the projector according to the first aspect of the invention has the first superimposing system formed by the superimposing lens and the first optical lens and the second superimposing system formed by the superimposing lens and the second optical lens, it is possible to adjust the size of the illumination area relatively freely in each of the first to third electro-optic modulators.

Also, in the projector according to the first aspect of the invention, it is possible to arrange the first optical lens and the second optical lens in a place where there is a relatively sufficient space.

Moreover, in the projector according to the first aspect of the invention, since the focal position of the superimposing system formed only by the superimposing lens with no optical lens arranged in the optical path and the focal position of the superimposing system formed by the superimposing lens and the optical lens with the optical lens arranged in the optical path can be made substantially the same, the positional relation between the superimposing lens and each electro-optic modulator need not be changed even when the optical lens is arranged in the optical path. Therefore, even when the size of the electro-optic modulator is changed, the color separation light guiding system need not be changed, and the color separation light guiding system before the change of the electro-optic modulator can be used as it is.

In this manner in the projector according to the first aspect of the invention, since the color separation light guiding system before the change of the electro-optic modulator can be used as it is even when the size of the electro-optic modulator is changed, the color separation light guiding system need not be redesigned and the number of processes can be reduced. Therefore, increase in the manufacturing cost of the projector can be restrained.

It is also preferable that at least one of the first optical lens and the second optical lens is a convex meniscus lens.

By using a meniscus lens as the first optical lens or the second optical lens according to the first aspect of the invention, it is possible to adjust the position of the principal point of the superimposing system in a direction along the optical axis while maintaining the focal position of the superimposing system. Therefore, the focal length of the superimposing system can be adjusted while the focal position of the superimposing system is maintained. As a result, the size of the illumination area in the image forming area can be adjusted.

It is also preferable that at least one of the first optical lens and the second optical lens is a composite lens including two or more lenses.

Also by using a composite lens including two or more lenses as the first optical lens or the second optical lens according to the first aspect of the invention, it is possible to adjust the position of principal point of the superimposing system in direction along the optical, axis while maintaining the focal position of the superimposing system. Therefore, the focal length of the superimposing system can be adjusted while the focal position of the superimposing system is maintained. As a result, the size of the illumination area in the image forming area can be adjusted.

It is also preferable that the first optical lens and the second optical lens have the same shape.

Such construction enables using lenses of the same shape as the first optical lens and the second optical lens and thus enables reduction in the manufacturing cost of the projector.

It is also preferable that, of the first optical lens and the second optical lens, the power of a lens arranged in an optical path through which color light having a relatively long a wavelength passes is larger than the power of a lens arranged in an optical path through which color light having a relatively short wavelength passes.

Generally, the refractive index of a lens has a wavelength dispersion characteristic. The refractive index for light having a relatively long wavelength is smaller than the refractive index for light having a relatively short wavelength. Therefore, the light having a relatively long wavelength is more difficult to refract than the light having a relatively short wavelength. If the power of the first optical lens and the power of the second optical lens are set, to be the same, the size of the illumination area cast in the image forming area tends to be different between the case where the light having a relatively long wavelength becomes incident and the case where the light having a relatively short wavelength becomes incident.

However, in such case, with the above-described construction, the light having a relatively long wavelength passes through the lens of the greater power than the light having a relatively short wavelength. The difficulty in refraction is compensated and the size of the illumination area cast in the image forming area can be the same in the case where the light having a relatively long wavelength becomes incident and in the case where the light having a relatively short wavelength becomes incident.

Thus, an illumination area of the same size is formed for each electro-optic modulator corresponding to each color light, and the illumination state of each color light becomes even. Color unevenness is reduced and color reproducibility improves.

The first aspect of the invention is particularly effective when it is applied to a projector using a lens array unit in which the first lens array and the second lens array are integrally molded, as the first lens array and the second lens array.

The lens array unit in which the first lens array and the second lens array are integrally molded is manufactured usually by press-molding glass. In this case, if the distance between the first lens array and the second lens array is long, the thickness of the lens array unit is increased and therefore crack or break may occur at the time of manufacturing. Also, if the thickness of the lens array unit is increased, the weight of the lens array unit increases and the material cost rises.

However, in the projector according to the first aspect of the invention, since the focal length of the superimposing system can be adjusted as described above, the focal length of the superimposing system can also be reduced. In the projector according to the first aspect of the invention, when the focal length f3 of superimposing system is reduced, if electro-optic modulators having a size equivalent to that of the traditional one are used, the focal length f1 of the second small lenses (and first small lenses) can be reduced while the length of the optical path from the superimposing lens to each electro-optic modulator and the size of the illumination area are maintained. Of course, also in the case where electro-optic modulators of a smaller size are used, the focal length f1 of the second small lenses (and first small lenses) can be reduced. Therefore, the distance between the first lens array and the second lens array can be reduced, and a lens array unit with a reduced thickness in which the first lens array and the second lens array are integrally molded can be easily manufactured. Also, since the lens array unit with a reduced thickness can be used for the projector, the projector can be miniaturized. At the same timer since the lens array unit can be reduced in weight, the material cost can be decreased. Moreover, when arranging the various optical components, alignment of the first lens array and the second lens array need not be carried out. After the various optical components are arranged, deterioration in the positional accuracy of the first lens array and the second lens array can be restrained.

The first aspect of the invention is also effective when it is applied to a projector using a lens array unit in which a light-transmissive member for guiding the light from the first lens array to the second lens array is provided between the first lens array and the second lens array and in which the first lens array and the second lens array are joined with each other via the light-transmissive member, as the first lens array and the second lens array.

For miniaturization of the projector, reduction in the thickness of the light-transmissive member is demanded with respect to the lens array unit as described above in order to realize reduction in the weight of the lens array unit and reduction in the material cost.

In this case, in the projector according to the first aspect of the invention, since the focal length of the superimposing system can be adjusted, the focal length of the superimposing system can also be reduced, as described above. When the focal length f3 of the superimposing system in the projector according to the first aspect of the invention is reduced, in the case where electro-optic modulators having a size equivalent to the traditional one are used, it is possible to reduce the focal length f1 of the second small lenses (and the first small lenses) while maintaining the length of the optical path from the superimposing lens to each electro-optic modulator and the size of the illumination area. Of course, also in the case where electro-optic modulators smaller than the traditional one are used, it is possible to reduce the focal length f1 of the second small lenses (and the first small lenses). Therefore, it is possible to reduce the distance between the first lens array and second lens array and to easily manufacture a lens array unit having a light-transmissive member with a reduced thickness. Also, since the lens array unit with a reduced thickness can be used for the projector, the projector can be miniaturized and the weight of the lens array unit can be reduced, thus enabling reduction in the material cost. Moreover, as the first lens array and the second lens array are aligned with each other in advance and then joined to the light-transmissive member when arranging the various optical components, it suffices to adjust the positions of this lens array unit including the first lens array and the second lens array and of the other optical components. Therefore, the alignment of the various optical components including this lens array unit can be easily carried out, and after the various optical components are arranged, deterioration in the positional accuracy of the first lens array and the second lens array can be restrained.

It is also preferable that the light-transmissive member has a refractive index substantially equal to that of the first lens array and the second lens array.

It is also preferable that an adhesive for joining the first lens array with the light-transmissive member and for joining the light-transmissive member with the second lens array has a refractive index substantially equal to that of the first lens array and the second lens array.

Such construction enables further restraint of reflection of light or the like on the boundary between each of the first lens array and the second lens array, and the light-transmissive member. Therefore, loss in the quantity of light due to such unwanted reflection or the like can be reduced further.

It is also preferable that the light-transmissive member has a coefficient of linear expansion substantially equal to that of the first lens array and the second lens array.

Such construction enables restraint of generation of thermal stress due to temperature chance caused by the use of the projector. Therefore, damage to the junction part between each of the first lens array and the second lens array, and the light-transmissive member, can be restrained.

Thus, it is preferable that the light-transmissive member is made of the same base material as the first lens array and the second lens array.

It is also preferable that the light source has an elliptic-surface reflector, an arc tube having a luminescence center near a first focal point of toe elliptic-surface reflector, and a concave lens that emits converged light reflected by the elliptic-surface reflector toward the first lens array.

With such construction, an illumination flux smaller than the size of the elliptic-surface reflector is emitted from the light source and therefore the projector can be miniaturized.

It is also preferable that the arc tube is provided with a reflector that reflects, toward the elliptic-surface reflector, the light emitted from the arc tube to the illuminated area side.

With such construction, the light radiated from the arc tube to the illuminated area side is reflected toward the elliptic-surface reflector. Therefore, the size of the elliptic-surface reflector need not be set to a size enough to cover the illuminated area-side end part of the arc tube and the elliptic-surface reflector can be miniaturized. As a result, the projector can be miniaturized.

It is also preferable that a polarization conversion element that emits the respective partial luminous fluxes split by the f1 lens array, as substantially one type of linearly polarized light with their directions of polarization aligned, is provided between the second lens array and the superimposing lens.

With such construction, the projector according to the first aspect of the invention is particularly adapted to a projector having an electro-optic modulator of a type of modulating polarized light, for example, an electro-optic modulator using a liquid crystal panel.

A method for manufacturing a projector according to a second aspect of the invention is a method for manufacturing a projector including: a light source that emits an illumination flux; a first lens array having plural first small lenses that split the illumination flux from the light source into plural partial luminous fluxes; a second lens array having plural second small lenses corresponding to the plural first small lenses; a superimposing lens that superimposes each partial luminous flux from the second lens array onto an illuminated area; an electro-optic modulator a modulates the light superimposed by the superimposing lens in accordance with image information; and a projection system that projects the light modulated by the electro-optic modulator. The method includes: preparing plural types of optical lenses having different focal lengths, as an optical lens that forms, together with the superimposing lens, a superimposing system having a different focal length from the focal length of the superimposing lens and having substantially the same focal position as the focal position of the superimposing lens; and selecting and arranging one of the plural types of optical lenses having the different focal lengths, or arranging none of the plural type of optical lenses having the different focal lengths, thereby adjusting the focal length of the superimposing system so that the size of an illumination area of light emitted from the superimposing system is adapted to the size of an image forming area in the electro-optic modulator.

Thus, with the method for manufacturing a projector according to the second aspect of the invention, the size of the illumination area can be adjusted by the very simple work of selecting and arranging one of the plural types of optical lenses prepared in advance or arranging none of the plural types of optical lenses having the different focal lengths. Therefore, the traditional work of adjusting the position of each optical element in the illumination system and thus adjusting the size of the illumination area need not be carried out, and the labor and time for adjusting the size of the illumination area can be significantly reduced.

Therefore, the method for manufacturing a projector according to the second aspect of the invention is an excellent manufacturing method that enables manufacture of a projector in which the size of the illumination area can be easily adjusted, or a projector in which even if the size of the electro-optic modulator is changed, the illumination system before the change of the electro-optic modulator can be used as it is.

It is preferable that, before adjusting the focal length of the superimposing system, plural types of superimposing lenses having substantially the same focal position and different focal lengths are prepared as the superimposing lens, and one of the plural types of superimposing lenses having the different focal lengths is selected and arranged, thereby roughly adjusting the focal length of the superimposing system so that the size of an illumination area of a light emitted from the superimposing lens is adapted to the size of an image forming area in the electro-optic modulator. It is preferable that in adjusting the focal length of the superimposing system, the focal length of the superimposing system is finely adjusted so that the size of the illumination area of the light emitted from the superimposing system is adapted to the size of the image forming area in the electro-optic modulator.

With such a method, even when the size of the electro-optic modulator is largely changed, the size of the illumination area generated by the superimposing system can be largely changed by replacing the superimposing lens along with the optical lens, and the size of the illumination area can be finely adjusted by the optical lens. Therefore, the illumination system before the change of the electro-optic modulator can be used as it as.

It is preferable that the projector has a color separation light guiding system having a first dichroic mirror that separates the light from the superimposing lens into first color light on one hand and second color light and third color light on the other and a second dichroic mirror that separates the second color light and the third color light from the first dichroic mirror into the second color light and the third color light, first to third electro-optic modulators that modulate the first to third color lights, respectively, as the electro-optic modulators and a light combining system that combines the color lights modulated by the first to third electro-optic modulator and emits the combined light to the projection system, and that the preparation of the plural types of optical lenses having the different focal lengths includes preparing plural types of first optical lenses having different focal lengths as a first optical lens that is to form, together with the superimposing lens, a first superimposing system having a different focal length from the focal length of the superimposing lens and having substantially the same focal position as the focal position of the superimposing lens, and preparing plural types of second optical lenses having different focal lengths as a second optical lens that is to form, together with the superimposing lens, a second superimposing system having a different focal length from the focal length of the superimposing lens and having substantially the same focal positions the focal position of the superimposing lens. It is preferable that the adjustment of the focal length of the superimposing system includes selecting and arranging one of the plural types of first optical lenses having the different focal lengths or arranging none of the plural types of first optical lenses having the different focal lengths, thereby adjusting the focal length of the first superimposing system so that the size of an illumination area of light emitted from the first superimposing system is adapted co the size of an image forming area in the first electro-optic modulator, and also includes selecting and arranging one of the plural types of second optical lenses having the different focal lengths or arranging none of the plural types of second optical lenses having the different focal lengths, thereby adjusting the focal length of the second superimposing system so that the size of an illumination area of light emitted from the second superimposing system is adapted to the size of an image forming area in the second electro-optic modulator and/or the third electro-optic modulator.

Also in the projector having the color separation light guiding system that split the light from the superimposing lens into the first to third color lights and the first to third electro-optic modulators that modulate the first to third color lights, respectively, and in which there are plural illumination areas superimposed by the superimposing system, the method as described above enables relatively free adjustment of the size of each illumination area in the first superimposing system that is formed by the superimposing lens and the first optical lens and that emits light illuminating the first electro-optic modulator and in the second superimposing system that is formed by the superimposing lens and the second optical lens and that emits light illuminating the second electro-optic modulator and/or the third electro-optic modulator.

BRIEF DESCRIPTION OF THE DRAWINGS

The invention will be described with reference to the accompanying drawings, wherein like numbers refer to like elements.

FIG. 5 shows an optical system of a projector 1004 according to Embodiment 3.

FIG. 7 shows an optical system of a projector 1008 according to Embodiment 5.

DESCRIPTION OF EXEMPLARY EMBODIMENTS

Figure 1:
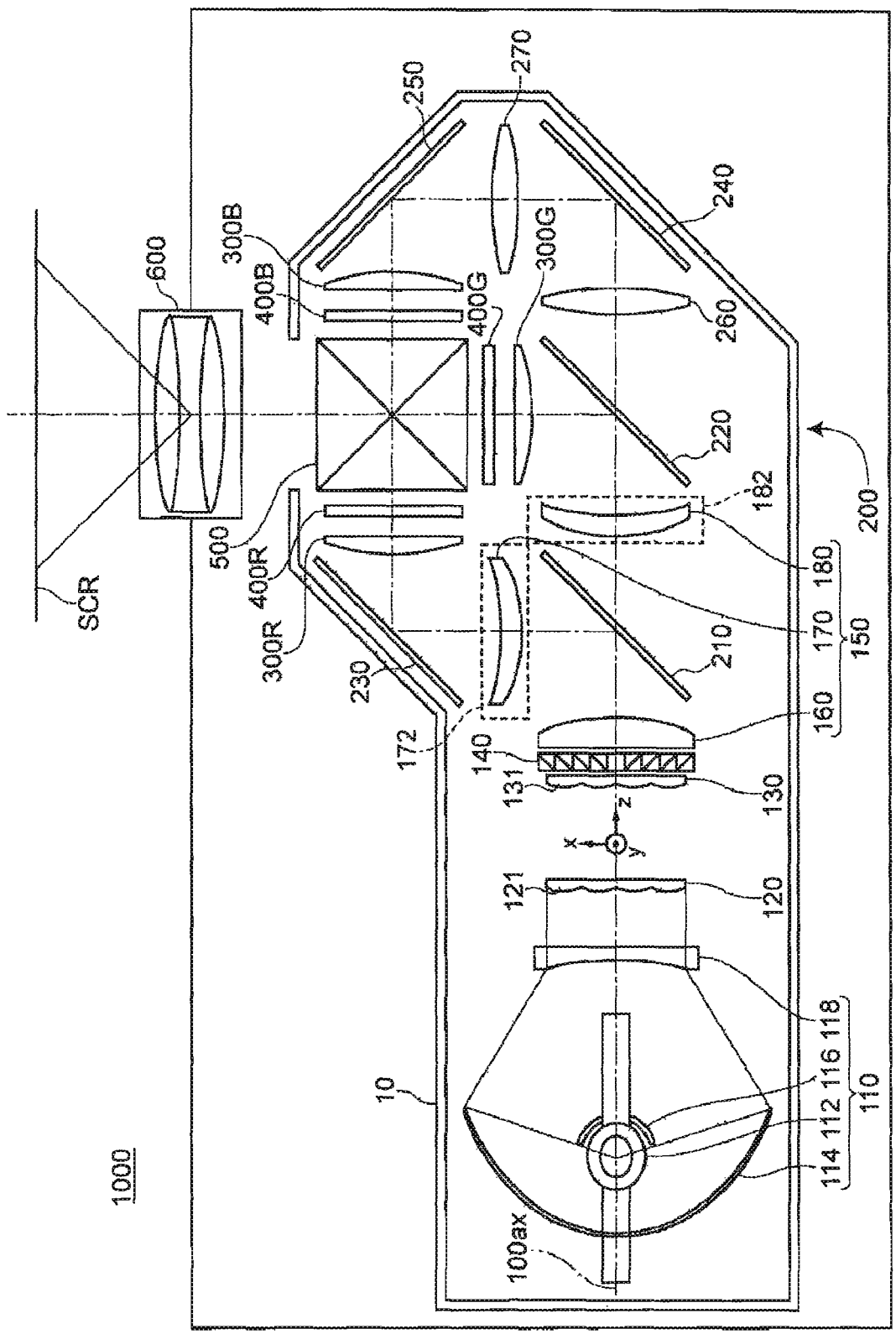
FIG. 1 shows an optical system of a projector 1000 according to Embodiment 1.

Hereinafter, the projector and the method for manufacturing a projector according to some aspects of the invention will be described with reference to embodiments shown in the drawings.

Embodiment 1

FIG. 1 shows an optical system of a projector 1000 according to Embodiment 1. In the following description, the three directions orthogonal to each other are referred to as z-axis direction (direction of illumination optical axis 1000ax in FIG. 1), x-axis direction (direction parallel to the paper surface and orthogonal to the z-axis direction in FIG. 1), and y-axis direction (direction perpendicular to the paper surface and orthogonal to the z-axis direction in FIG. 1).

The projector 1000 according to Embodiment 1 is a projector including: a light source 110 that emits a luminous flux; a first lens array 120 having plural first small lenses 121 that split the luminous flux from the light source 110 into plural partial luminous fluxes; second lens array 130 having plural second small lenses 131 corresponding to the plural first small lenses 121; a polarization conversion element 140 that emits the respective partial luminous fluxes split by the first lens array 120 as substantially one type of linearly polarized light with their directions polarization aligned; a superimposing system 150 including a superimposing lens 160 that superimposes the respective partial luminous fluxes from the polarization conversion element 140 on an illuminated area, a first optical lens 170 an a second optical lens 180; a color separation light guiding system 200 that separates the light from the superimposing lens 160 into three color lights and guides the light to the illuminated area; three electro-optic modulators 400R, 400G, 400B that modulate the three color lights separated by the color separation light guiding system 200, respectively, in accordance with image information; a cross dichroic prism 500 as a light combining system that combines the color lights modulated by the electro-optic modulators 400R, 400G, 400B; a projection system 600 that projects the light combined by the cross dichroic prism 500 onto a projection surface of a screen SCR or the like; and an optical element housing casing 10, as shown in FIG. 1.

The light source 110 has an elliptic-surface reflector 114, an arc tube 112 having a luminescence center near a first focal point of the elliptic-surface reflector 114, an auxiliary mirror 116 as a reflector that is provided on the arc tube 112 and reflects the light emitted from the arc tube 112 to the illuminated area side, toward the elliptic-surface reflector 114, and a concave lens 18 that converts the converged light reflected by the elliptic-surface reflector 114 to collimated light and emits the collimated light toward the first lens array 120. The light source 110 emits a luminous flux having an illumination optical axis 100ax as its center axis.

The arc tube 112 has a bulb part and a pair of sealed parts extending to both sides of the bulb part. The elliptic-surface reflector 114 has a tubular neck-like part inserted and fixed in one of the sealed parts of the arc tube 112, and a reflective concave surface that reflects the light radiated from the arc tube 112 toward a second focal position.

The auxiliary mirror 116 is provided at a position facing the elliptic-surface reflector 114 with the arc tube 112 situated between them. Of the light radiated from the arc tube 112, the auxiliary mirror 116 returns the light that is not directed toward the elliptic-surface reflector 114, to the arc tube 112, and causes this light to become incident on the elliptic-surface reflector 114.

The concave lens 118 is arranged on the illuminated area side to the elliptic-surface reflector 114. The concave lens 18 is constructed to emit the light from the elliptic-surface reflector 114 toward the first lens array 120.

The first lens array 120 has the function of a luminous flux splitting system that splits the light from the concave lens 118 into plural partial luminous fluxes. The first lens array 120 has the plural first small lenses 121 arrayed in a matrix form in a plane orthogonal to the illumination optical axis 100$ax$. The outer shape of the first small, lenses 121 is similar to the outer shape of the image forming areas in the electro-optic modulators 400R, 400G, 400B.

The second lens array 130 is an optical element that condenses the plural partial luminous fluxes split by the first lens array 120. The second lens array 130, similar to the first lens array 120, has the plural second small lenses 131 arrayed in a matrix form in a plane orthogonal to the illumination optical axis 100$ax$.

The polarization conversion element 140 is a polarization conversion element that emits the respective partial luminous fluxes split by the first lens array 120 as substantially one type of linearly polarized light with their directions of polarization aligned.

The polarization conversion element 140 has: a polarization separation layer that transmits one linearly polarized light component of the polarized light components included in the luminous flux from the light source 110 and reflects the other linearly polarized light component into a direction perpendicular to the illumination optical axis 100$ax$; a reflection layer that reflects the other linearly polarized light component reflected by the polarization separation layer into a direction parallel to the illumination optical axis 100$ax$; and a retardation film that converts the other linearly polarized light component reflected by the reflection layer to the one linearly polarized light component.

The super imposing system 150 has the superimposing lens 160 that superimposes the respective partial luminous fluxes from the polarization conversion element 140 on the illuminated area, the first optical lens 170, and the second optical lens 180.

Although not shown here, in the superimposing system 150, a superimposing system that is formed by the superimposing lens 160 and the first optical lens 170 and that superimposes the first color light of the plural partial luminous fluxes separated by the first lens array 120 onto the image forming area in the first electro-optic modulator 400R, is referred to as first superimposing system, and a superimposing system that is formed by the superimposing lens 160 and the second optical lens 180 and that superimposes the second color light an the third color light of the plural partial luminous fluxes separated by the first lens array 120 on to the image forming areas of the second electro-optic modulator 400G and the third electro-optic modulator 400B, is referred to as second superimposing system.

The first optical lens 170 and the second optical lens 180 will be described in detail later.

The color separation light guiding system 200 has a first dichroic mirror 210, a second dichroic mirror 220, reflection mirrors 230, 240, 250, a light incident-side lens 260, and a relay lens 270. The color separation light guiding system 200 has the function of separating the illumination luminous flux emitted of the superimposing lens 160 into three color lights, that is, red light as the first color light, green light as the second color light, and blue light as the third color light, and guiding the respective color lights to the first to third electro-optic modulators 400R, 400G, 400B as the illumination targets.

The first dichroic mirror 210 and the second dichroic mirror 220 are optical elements in which an wavelength selection layer reflecting luminous fluxes in a predetermined wavelength zone onto a substrate and transmitting luminous fluxes in the other wavelength mirror that transmits the red light component and dichroic mirror 220 is a mirror that transmits the blue light component and reflects the green light component.

The red light component reflected by the first dichroic mirror 210 passes through the first optical lens 170, is turned by the reflection mirror 230 and becomes incident on the image forming area in the first electro-optic modulator 400R for red light via a condensing lens 300R.

The condensing lens 30R is provided for converting each partial luminous flux from the first optical lens 170 to a luminous flux substantially parallel to each principal ray. Condensing lenses 300G, 300B provided upstream of the second electro-optic modulator 400G and the third electro-optic modulator 400B have the similar construction, as the condensing lens 300R.

The green light component and the blue light component passed through the first dichroic mirror 210 then pass through the second optical lens 180. The green light component passed through the second optical lens 180 is reflected by the second dichroic mirror 220, then passes through the condensing lens 300G and illuminates the image forming area in the second electro-optic modulator 4000 for green light. On the other hand, the blue light component passed through the second optical lens 180 is transmitted through the second dichroic mirror 220, then passes through the light incident-side lens 260, the light incident-side reflection mirror 240, the relay lens 270, the light exiting-side reflection mirror 250 and the condensing lens 300B, and illuminates the image forming area in the third electro-optic modulator 400B for blue light. The light incident-side lens 260, the relay tens 270, and the reflection mirrors 240, 250 have the function of guiding the blue light component transmitted through the second dichroic mirror 220 to the third electro-optic modulator 400B.

Since the length of the optical path of the blue light is longer than the length of the optical paths of the other color lights, the light incident-side lens 260, the relay lens 270 and the reflection mirrors 240, 250 are provided in the optical path of the blue light in order to prevent lowering of the light utilization efficiency due to scattering of light or the like. In the projector 1000 according to Embodiment 1, such construction is employed because the optical path of the blue light is longer. However, a construction of increasing the length of the optical path of the red light and using the light incident-side lens 260, the relay lens 270 and the reflection mirrors 240, 250 in the optical path of the red light may also be considered.

The first to third electro-optic modulators 400R, 400C, 400B are for modulating the illumination fluxes in accordance with image information and thus forming a color image. They are illumination targets of the light source 110. Although not shown, light incident-side polarizers are arranged between the condensing lenses 300R, 300G, 300B and the electro-optic modulators 400R, 400G, 400B, and light exiting-side polarizers are arranged between the electro-optic modulators 400R, 400G, 400B and the cross dichroic prism 500. These light incident-side polarizers, electro-optic modulators 400R, 400G, 400B, and light exiting-side polarizers perform light modulation of each incident color light.

The first to third electro-optic modulators 400R, 400G, 400B are formed by tightly closing and sealing liquid crystal, which is an electro-optic substance, between a pair of transparent glass substrates. They modulate the direction of polarization of the one type of linearly polarized light emitted from the light exiting-side polarizers in accordance with provided image information, for example, by using a polysilicon TFT as a switching element.

The cross dichroic prism 500 as the light-combining system is an optical element that combines optical images modulated for the respective color lights emitted from the light exiting-side polarizers and thus forms a color image. This cross dichroic prism 500 is formed by bonding four right-angled prisms and has a substantially square shape as viewed on a plane. On the substantially X-shaped boundaries formed by bonding the right-angled prisms, dielectric multi layer films are formed. The dielectric multilayer film formed on one boundary of the substantially X-shape is for reflecting the red light, and the dielectric multilayer film formed on the other boundary is for reflecting the blue light. As the red light and the blue light are turned by these dielectric multilayer films and aligned with the traveling direction of the green light, the three color lights are combined.

The color image emitted from the cross dichroic prism 500 is projected in a magnified manner by the projection system 500 and forms a large-screen image on the screen SCR.

The protector 1000 according to Embodiment 1 has the first optical, lens 170 and the second optical lens 180, as optical lenses, and a first optical lens fixing device 172 and a second optical lens fixing device 182, as optical lens fixing devices. These parts will now be described in detail.

Figure 2A:
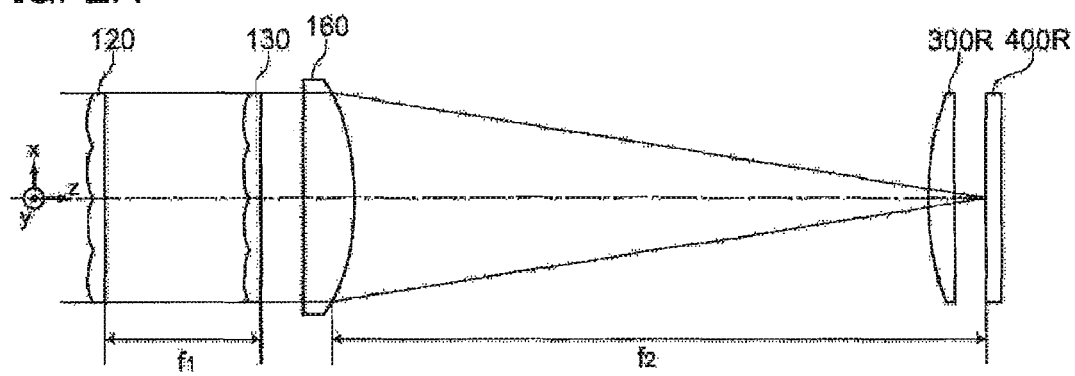
FIGS. 2A to 2D illustrate the effects of the projector 1000 according to Embodiment 1.
Figure 2B:
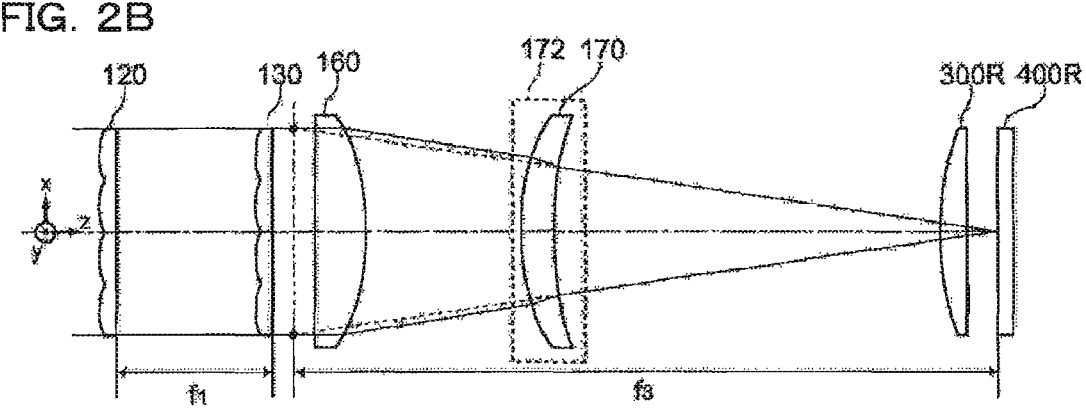
Figure 2C:
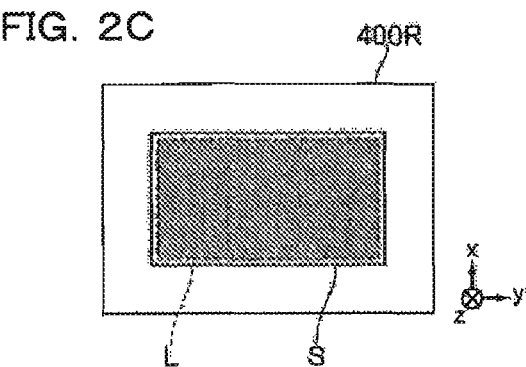
Figure 2D:
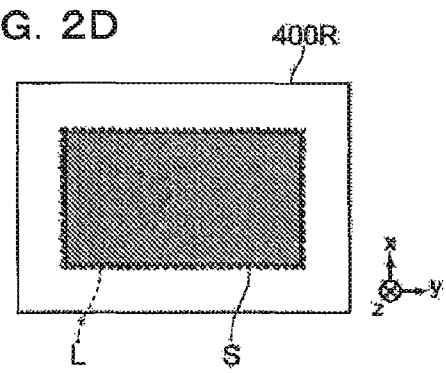

FIGS. 2A to 2D illustrate the effects of the projector 1000 according to Embodiment 1. FIG. 2A schematically shows the relation between the focal length f1 of the second lens array 130 and the focal, length f2 of the first superimposing system in the case where the first superimposing system is formed only by the superimposing lens 160 without arranging the first optical lens 170 in the optical path FIG. 2B schematically shows the relation between the focal length f1 of the second lens array 130 and the focal length f3 or the first superimposing system in the case where the first optical lens 170 is arranged in the optical path and the first superimposing system is formed by the superimposing lens 160 and the first optical lens 170. FIG. 2C is a schematic view showing the illumination state in the image forming area S of the first electro-optic modulator 400R in the case of FIG. 2A. FIG. 2D is a schematic view showing the illumination state in the image forming area S of the first electro-optic modulator 400R in the case of FIG. 2B. In FIGS. 2A and 2B to simplify the explanation, the optical path of the red light, of the red light, green light and blue light, is shown and the condensing lens 300R and the electro-optic modulator 400R arranged in the optical path of the red light are shown. The polarization conversion element 140, the first dichroic mirror 210 and the reflection mirror 230 are not shown.

In the projector 1000 according to Embodiment 1, the focal length is the length from the principal point of the optical system to the focal point, and the focal position is the position of the focal point in the optical system.

The projector 1000 according to Embodiment 1 is a projector having the first optical lens fixing device 172 for removably fixing the firsts optical lens 170 to the optical element housing casing 10, and the second optical lens fixing device 182 for removably fixing the second optical lens 180 to the optical element housing casing 10, as shown in FIG. 1.

Figure 3A:
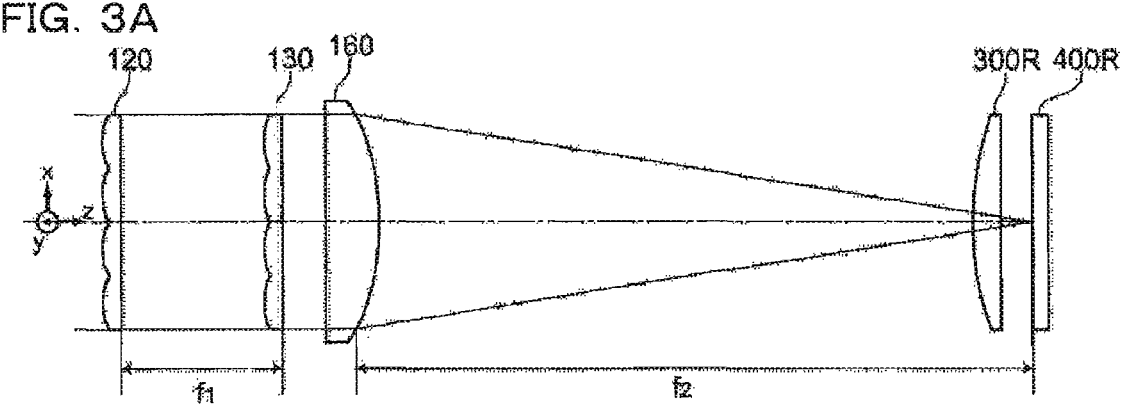
FIGS. 3A to 3D illustrate the effects of a projector 1000a according to a modification of Embodiment 1.
Figure 3B:
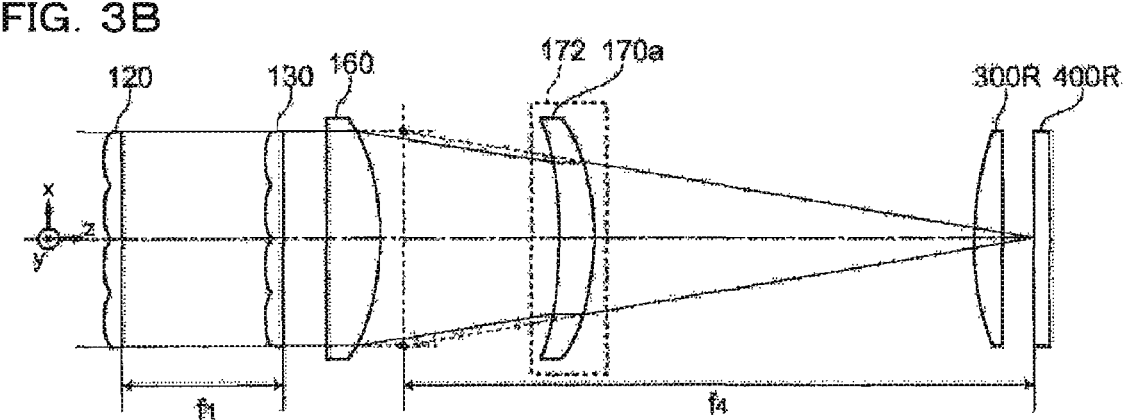

The lens 160 and the focal position are at the same positions in both FIG. 3A (where no optical lens 170a is present) and in FIG. 3B (in which the optical lens 170a is present). The first surface of the optical lens 170a in FIG. 3B causes a delay in the convergence of the light that would otherwise affect its focal position if not for the second surface of the lens. However, the second surface of the lens 170a is provided with a curvature that is different from its first surface. In order to make up for the delayed convergence of the light caused by the lens 170a, the second surface will cause a faster convergence of the light than the original convergence, such that the light will reach the same focal position as the unaltered path of the light.

The lens 160 and the focal position are at the same positions in both FIG. 2A (where no optical lens 170 is present) and in FIG. 2B (in which the optical lens 170 is present). The first surface of the optical lens 170 in FIG. 2B causes a faster convergence of the light that would otherwise affect its focal position if not for the second surface of the lens. However, the second surface of the lens 170 is provided with a curvature that is different from its first surface. In order to make up for the faster convergence of the light caused by the lens 170, the second surface will cause a slower convergence of the light than the original convergence, such that the light will reach the same focal position as the unaltered path of the light.

The first optical lens 170 is a convex meniscus lens having the largest thickness on the optical axis in the first optical lens 170 alone. The first optical lens 170 is arranged between the first dichroic mirror 210 and the reflection mirror 230 with its convex surface facing the light incident side, and is fixed by the first optical lens fixing device 172. When the first optical lens 170 is arranged between the first dichroic mirror 210 and the reflection mirror 230, the first optical lens 170, together with the superimposing lens 160, forms the first superimposing system having the focal length f3 longer than the focal length f2 of the superimposing lens 160 and having substantially the same focal position of the focal position of the superimposing lens 160, as shown in FIGS. 1 and 2B.

When the first optical lens 170 is not arranged between the first dichroic mirror 210 and the reflection mirror 230, the first superimposing system in the optical path of the red light is formed only by the superimposing lens 160, and therefore the focal length of the first superimposing system is f2, which is the focal length of the superimposing lens 160, as shown in FIG. 2A. On the other hand, when the first optical lens 170 is arranged between the first dichroic mirror 210 and the reflection mirror 230, the first superimposing system in the optical path of the red light is formed by the superimposing lens 160, the first optical lens 170, and therefore the focal length of the first superimposing system is f3, which is longer than the focal length f2 of the first superimposing system formed only by the superimposing lens 160, as shown in FIG. 2B. In this case, the focal position of the first superimposing system formed only by the super imposing lens 160 without arranging the first optical lens 170, and the focal position of the first superimposing system formed by the superimposing lens 160 and the first optical lens 170 in the case where the first optical lens 170 is arranged, are substantially the same.

The first optical lens fixing device 172 is for removably fixing the first optical lens 170 to the optical element housing casing 10. As the fixing device for fixing the first optical lens 170, for example, a fixing device having a groove chat slidably holds therein the edge part of the optical lens 170, or other known fixing devices can be used.

The second optical lens 180 is a convex meniscus lens having the largest thickness on the optical axis in the second optical lens 180 alone. The second optical lens 180 is arranged between the first dichroic mirror 210 and the second dichroic mirror 220 with its convex surface facing the light incident side, and is fixed by the second optical lens fixing device 182. When the second optical lens 180 is arranged between the first dichroic mirror 210 and the second dichroic mirror 220, the second optical lens 180, together with the superimposing lens 160, forms the second superimposing system having the focal length f3 longer than the focal length f2 of the superimposing lens 160 and having substantially the same focal position as the focal position of the superimposing lens 160.

As in the case of the first optical lens 170, when the second optical lens 180 is not arranged between the first dichroic mirror 213 and the second dichroic mirror 220, the second superimposing system in the optical path of the green light and the optical path of the blue light is formed only by the superimposing lens 160, and therefore the focal length of the second superimposing system is f2, which is the focal length of the superimposing lens 160. On the other hand, when the second optical lens 180 is arranged between the first dichroic mirror 213 and the second dichroic mirror 220, the second superimposing system in the optical path of the green light and the optical path of the blue light is formed by the superimposing lens 160 and the second optical lens 180, and therefore the focal length of the second superimposing system is f3, which is longer than the focal length f2 of the second superimposing system formed only by the superimposing lens 160. In this case, the focal position of the second superimposing system formed only by the superimposing lens 160 without arranging the second optical lens 180, and the focal position of the second superimposing system formed by the superimposing lens 160 and the second optical lens 180 in the case where the second optical lens 180 is arranged, are substantially the same.

The second optical lens fixing device 182 is for fixing the second optical lens 130 to toe optical element housing casing 10. As the fixing device for fixing the second optical lens 180, for example, a fixing device having a groove that slidably holds therein the edge part of the second optical lens 180, or other known fixing devices can be used.

Thus, in the case where the size of the illumination area L in the electro-optic modulators 400R, 400G, 400B must be adjusted, in the projector 1000 according to Embodiment 1, the first optical lens 170 can be arranged between the first dichroic mirror 210 and the reflection mirror 230 (first electro-optic modulator 400R), and the second optical lens 180 can be arranged between the first dichroic mirror 210 and the second dichroic mirror 220. Therefore, the focal length f3 of the superimposing system 150 formed by the superimposing lens 160 the first optical lens 170 and the second optical lens 180 can be adjusted.

In this case, the size of the illumination area L is calculated by multiplying the size of the outer shape of the first small lenses 121 of the first lens array 120 by the ratio of the focal length f3 of the superimposing system 150 to the focal length f1 of the second small lenses 131 of the second lens array 130 (=f3/f1 (magnification)). That is, in the optical path of the red light, since the focal length f3 of the first superimposing system formed by the superimposing lens 160 and the first optical lens 170 is longer than the focal length f2 of the first superimposing system formed only by the superimposing lens 160, it is possible to increase the size of the illumination area L by arranging the first optical lens 170 at a predetermined position in the optical path. Similarly, in the optical path of the green light and the optical path of the blue light, it is possible to increase the size of the illumination area L by arranging the second optical lens 180 in the optical path.

Thus, in the projector 1000 according to Embodiment 1, by arranging the first optical lens 170 or the second optical lens 180 at a predetermined position in the optical path and fixing the lens by the first optical lens fixing device 172 or the second optical lens fixing device 182, it is possible to adjust the size of the illumination area L to an appropriate size with respect to the image forming area S, as shown in FIGS. 2C and 2D.

Also, in the projector 1000 according to Embodiment 1, the focal position of the superimposing system 150 formed only by the superimposing lens 160 without arranging the first optical lens 170 and the second optical lens 180 at predetermined positions in the optical path, and the focal position of the superimposing system 150 formed by the superimposing lens 160, the first optical lens 170 and the second optical lens 180 in the case where the first optical lens 170 and the second optical lens 180 are arranged at predetermined positions in the optical path, can be substantially the same. Therefore, even when the first optical lens 170 and the second optical lens 180 are arranged at predetermined positions in the optical path, illuminating light having relatively even in-plane light intensity distribution with no defocus is cast to the image forming areas S in the electro-optic modulators 400R, 400G, 400B.

Moreover, in the projector 1000 according to Embodiment 1, the size of the illumination area L can be adjusted by the very simple construction of arranging the first optical lens 170 and the second optical lens 180 at predetermined positions in the optical path and fixing the lenses by the first optical lens fixing device 172 and the second optical lens fixing device 182.

Meanwhile, in the projector 1000 according to Embodiment 1, even when the size of the electro-optic modulator is changed, it is possible to arrange the first optical lens 170 and the second optical lens 180 at predetermined position in the optical path, for the same reasons as described above. Therefore, the focal length f3 of the superimposing system 150 can be adjusted and consequently the size of the illumination area L can be adjusted and adapted to the size of the image forming area in the changed electro-optic modulator.

Also, in the projector 1000 according to Embodiment 1, since the first optical lens 170 and the second optical lens 180 are arranged at predetermined positions in the optical path, the size of the illumination area L can be adjusted by adjusting the focal length f3 of the superimposing system 150. Therefore, the size of the first small lenses 121 and the focal length f1 of the second small lenses 131 need not be adjusted for adjusting the size of the illumination area L. Thus, even when the size of the electro-optic modulator is changed, the illumination system before the change of the electro-optic modulator can be used as it is.

In this manner, in the projector 1000 according to Embodiment 1, since the illumination system before the change of the electro-optic modulator can be used as it is even when the size of the electro-optic modulator is changed, the illumination system need not be redesigned and the number of processes can be reduced. Therefore increase in the manufacturing cost of the projector can be restrained.

Thus, the projector 1000 according to Embodiment 1 is a projector in which the size of the illumination area can be adjusted easily, or a projector in which even when the size of the electro-optic modulator is changed, the illumination system before the change of the electro-optic modulator can be used as it is.

The projector 1000 according to Embodiment 1 has the first optical lens 170 and the second optical lens 180, as optical lenses, as described above. The first optical lens 170, together with the superimposing lens 160, forms the first superimposing system having a different focal length from the focal length of the superimposing lens 160 and having substantially the same focal position as the focal position of the superimposing lens 160. The second optical lens 180, together with the superimposing lens 160, forms the second superimposing system having different focal length from the focal length of the superimposing lens 160 and having substantially the same focal position as the focal position of the superimposing lens 160.

Thus, since the projector 1000 according to Embodiment 1 has the first superimposing system formed by the superimposing lens 160 and the first optical lens 170 and the second superimposing system formed by the superimposing lens 160 and the second optical lens 180, it is possible to adjust the size of the illumination area relatively freely in each of the first to third electro-optic modulators 400R, 400G, 400B.

Also, in the projector 1000 according to Embodiment 1, it is possible to arrange the first optical lens 170 and the second optical lens 180 in a place where there is a relatively sufficient space.

Moreover, in the protector 1000 according to Embodiment 1, since the focal position of the superimposing system 150 formed only by the superimposing lens 160 without arranging the first optical lens 170 and the second optical lens 180 at predetermined positions in the optical path and the focal position of the superimposing system 150 formed by the superimposing lens 1607 the first optical lens 170 and the second optical lens 180 in the case where the first optical lens 170 and the second optical lens 180 are arranged at predetermined positions in the optical path can be made substantially the same, the positional relation between the superimposing lens 160 and each of the electro-optic modulators 400R, 400G, 400B need not be changed even when the first optical lens 170 and the second optical lens 180 are arranged at predetermined posit ions in the optical path. Therefore, even when the size of the electro-optic modulator is changed, the color separation light guiding system need not be changed, and the color separation light guiding system 200 before the change of the electro-optic modulator can be used as it is.

In this manner, in the projector 1000 according to Embodiment 1, since the color separation light guiding system 200 before the change of the electro-optic modulator can be used as it is even when the electro-optic modulator is changed, the color separation light guiding system need not be redesigned and the number of processes can be reduced. Therefore, increase in the manufacturing cost of the projector can be restrained.

In the projector accords to Embodiment 1, since the first optical lens fixing device 172 and the second optical lens fixing device 182 are provided as the optical lens fixing devices, it is possible to separately adjust at least the size of the illumination area in the first electro-optic modulator 400R and tae size of the illumination area in the second and third electro-optic modulators 400G, 400B.

In the projector 1000 according to Embodiment 1, the first optical lens 170 and the second optical lens 180 are convex meniscus lenses.

By using convex meniscus lenses as the first optical lens 170 and the second optical lens 180, it is possible to adjust the position of the principal point of the superimposing system 150 in a direction along the optical axis while maintaining the focal position of the superimposing system 150. Therefore, the focal length of the superimposing system 150 can be adjusted while the focal position of the superimposing system 150 is maintained. As a result, the size of the illumination area L in the image forming area can be adjusted.

In the projector 1000 according to Embodiment 1, since the first optical lens 170 and the second optical lens 180 are arranged with their convex surfaces facing the light incident side, the focal length f3 of the superimposing system 150 can be increased while the focal position of the superimposing system 150 is maintained. Thus, the size of the illumination area L in the image forming area S can be increased.

In the projector 1000 according to Embodiment 1, the first optical lens 170 and the second optical lens 183 have the same shape.

This enables using lenses of the same shape as the first optical lens 170 and the second optical lens 100 and thus enables reduction in the manufacturing cost of the projector.

The first optical lens 170, the second optical lens 100, the first optical lens fixing device 172 and the second optical lens fixing device 182 in the projector 1000 according to Embodiment 1 have been described above in detail. The projector 1000 according to Embodiment 1 also has the following features.

In the projector 1000 according to Embodiment 1, the light source 110 has the elliptic-surface reflector 114, the arc tube 112 having a luminescence center near the first focal point of the elliptic-surface reflector 114, and the concave lens 118 that emits converged light reflected by the elliptic-surface reflector 114 toward the first lens array 120, as shown in FIG. 1.

Thus, an illumination flux smaller than the size of the elliptic-surface reflector 114 is emitted from the light source 110 and therefore the projector can be miniaturized.

In the projector 1000 according to Embodiment 1, the arc tube 112 is provided with the auxiliary mirror 116 as a reflector that reflects, toward the elliptic-surface reflector 114, the light emitted from the arc tube 112 to the illuminated area side.

Thus, the light radiated from the arc tube 112 to the illuminated area side is reflected toward the elliptic-surface reflector 114. Therefore, the size of the elliptic-surface reflector 114 need not be set to a size enough to cover the illuminated area-side end part of the arc tube 112 and the elliptic-surface reflector can be miniaturized. As a result, the projector can be miniaturized.

The method for manufacturing a projector according to Embodiment 1 will now be described.

The method for manufacturing a projector according to Embodiment 1 is a method for manufacturing the projector 1000. The method includes: preparing plural types of first optical lenses having different focal lengths as the first optical lens 170; preparing plural types of second optical lenses having different focal lengths as the second optical lens 180; selecting and arranging one of the plural types of first optical lenses having the different focal lengths or arranging none of the plural types of first optical lenses having the different focal lengths, thereby adjusting the focal length of the first superimposing system so that the size of the illumination area of the light emitted from the first superimposing system is adapted to the size of the image forming area in the first electro-optic modulator 400R; and selecting and arranging one of the plural types of second optical lenses having the different focal lengths or arranging none of the plural types of second optical lenses having the different focal lengths, thereby adjusting the focal length of the second super imposing system, so that the size of the illumination area of the light emitted from the second superimposing system is adapted to the size of the image forming area in the second electro-optic modulator 400G and/or the third electro-optic modulator 400B.

Specifically, first, plural types of first optical lenses and second optical lenses having different focal lengths from each other are prepared as the first optical lens 170 and the second optical lens 180.

Next, an appropriate lens of the prepared first optical lenses is selected no arranged as the first optical lens 170 while the size of the illumination area L in the image forming area S in the electro-optic modulator 400R is confirmed. In the case where the size of the illumination area L has been adapted to the size of the image forming area S in the electro-optic modulator 400R without arranging the first optical lens 170, the first optical lens 170 need not be arranged.

Also for the second optical lens 180, as in the case of the first optical lens 170, an appropriate lens of the prepared second optical lenses is selected and arranged as the second optical lens 180 while the size of the illumination area L in the image forming area S in the electro-optic modulators 400G, 400B is confirmed. In the case where the size of the illumination area L has been adapted to the size of the image forming area S in the electro-optic modulators 400G, 400B without arranging the second optical lens 180, the second optical lens 180 need not be arranged.

In this case, a lens having the same shape as the lens selected as the first optical lens 170 may be selected and arranged as the second optical lens 180.

Thus, with the method for manufacturing a projector according to Embodiment 1, the size of the illumination area L can be adjusted by the very simple work of selecting and arranging one of the plural types of first optical lenses or second optical lenses prepared in advance, or arranging none of these lenses. Therefore, the traditional work of adjusting the position of each optical element in the illumination system and thus adjusting the size of the illumination area need not be carried out, and the labor and time for adjusting the size of the illumination area can be significantly reduced.

Thus, the method for manufacturing a projector according to Embodiment 1 is an excellent manufacturing method that enables manufacture of a projector in which the size of the illumination area can be easily adjusted, or a projector in which even if the size of the electro-optic modulator is changed, the illumination system before the change of the electro-optic modulator can be used as it is.

The method for manufacturing a projector according to Embodiment 1 also has an advantage that the size of the illumination area can be adjusted relatively freely in each of the first superimposing system and the second superimposing system.

In the projector 1900 according to Embodiment 1, the first optical lens and the second optical lens made of convex meniscus lenses having a convex surface on the light incident side are arranged at predetermined position in the optical path, thereby increasing the focal length of the superimposing system while maintaining substantially the same focal position of the superimposing system. However, the invention is not limited to this, and for example, the following modification can be made.

Figure 3C:
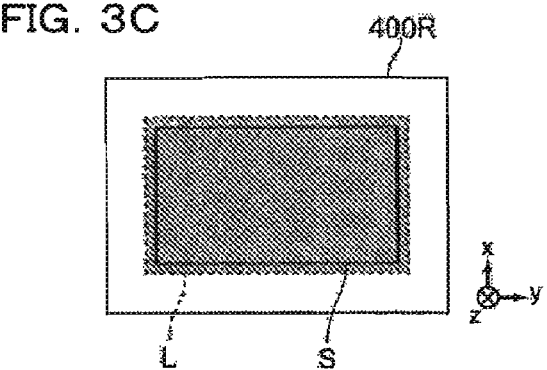
Figure 3D:
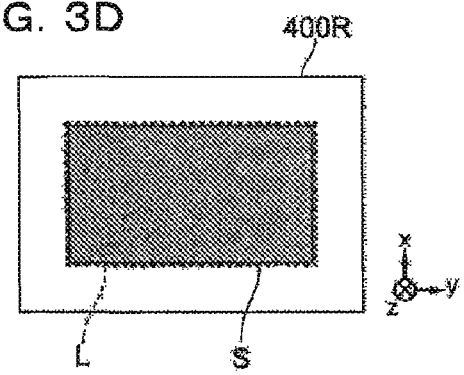

FIGS. 3A to 3D illustrate the effects of a projector 1000a according to a modification of Embodiment 1. FIG. 3A schematically shows the relation between the focal length f1 of the second lens array 130 and the focal length f2 of the first superimposing system in the case where the first superimposing system is formed only by the superimposing lens 160 without arranging the first optical lens 170 in the optical path. FIG. 3B schematically shows the relation between the focal length f1 of the second lens array 130 and the focal length f4 of the first superimposing system in the case where a first optical lens 170a is arranged in optical path and the first superimposing system is formed by the super imposing lens 160 and the first optical lens 170a. FIG. 3C is a schematic view showing the illumination state in the image forming area S of the first electro-optic modulator 400R in the case of FIG. 3A. FIG. 3D is a schematic view showing the illumination state in the image forming area S of the first electro-optic modulator 400R in the case of FIG. 3B. In FIGS. 3A and 3B, to simplify the explanation, the optical path of the red light, of the red light, green light and blue light, is shown and the condensing lens 300R and the electro-optic modulator 400R arranged in the optical path of the red light are shown. The polarization conversion element 140, the first dichroic mirror 210 and the reflection mirror 230 are not shown.

In the projector 1000a (not shown) according to the modification of Embodiment 1, the first optical lens 170 and second optical lens 118a made of convex meniscus lenses having a concave surface on the light incident sloe (only the first optical lens 170a is shown in FIG. 3B) are arranged at predetermined positions in the optical path, thereby reducing the focal length of the superimposing system while maintaining substantially the same focal position of the superimposing system, as shown in FIG. 3B The first optical lens 170a is a convex meniscus lens having the largest thickness on the optical axis in the first optical lens 170a alone. The second optical lens 189a is a convex meniscus lens having the largest thickness on the optical axis in the second optical lens 180a alone.

Thus, in the projector 1009a according to the modification of Embodiment 1, contrary to the projector 1000 according to Embodiment 1, the size of the illumination area L in the image forming area S can be reduced, as shown in FIGS. 3C and 3D. However, as in the case of the projector 1000 according to Embodiment 1, since the position of the principal point of the superimposing system can be adjusted in a direction along the optical axis while the focal position of the superimposing system is maintained, the size of the illumination area L in the image forming area can be adjusted.

Embodiment 2

Figure 4:
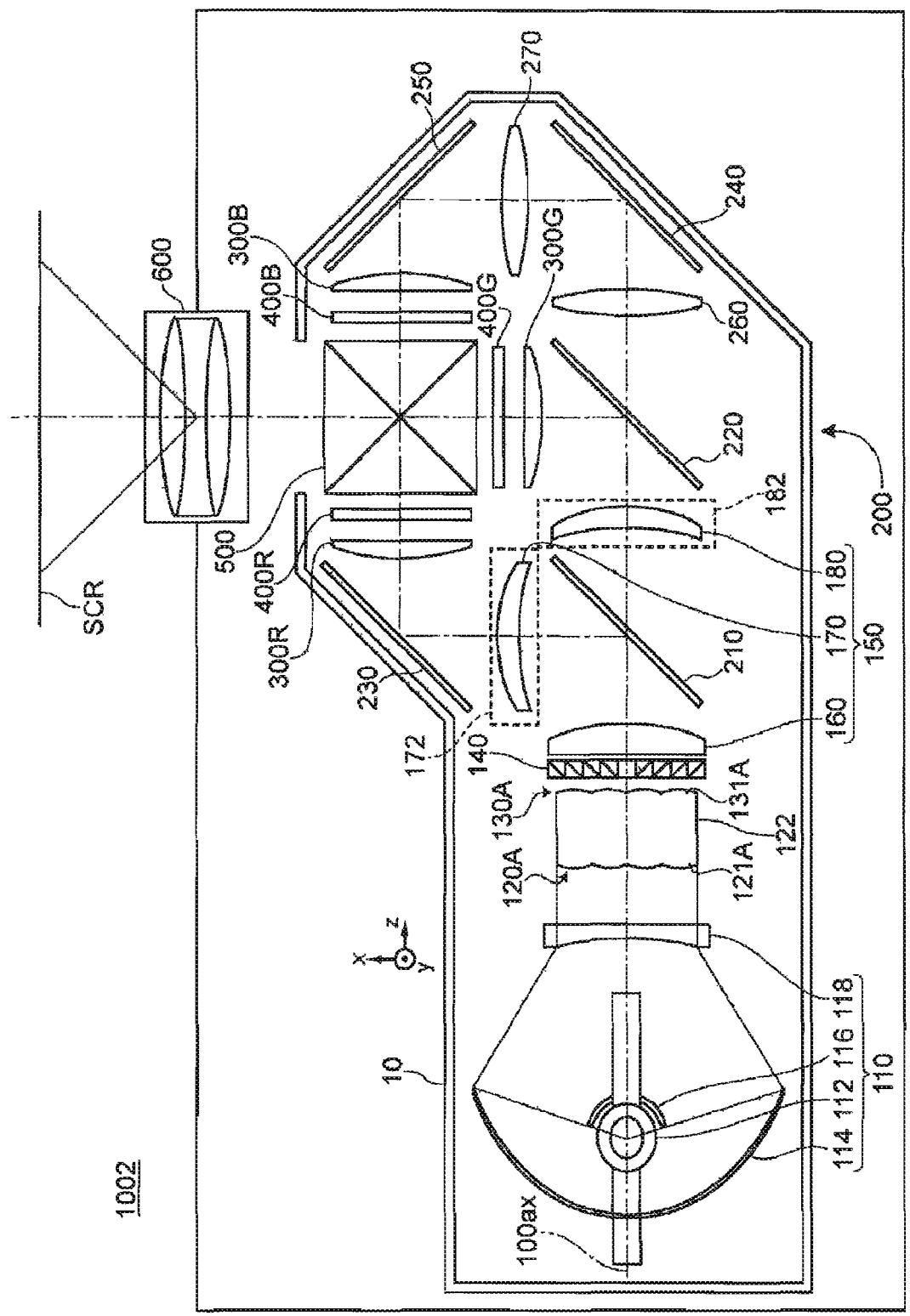
FIG. 4 shows an optical system of a projector 1002 according to Embodiment 2.

FIG. 4 shows an optical system of a protector 1002 according to Embodiment 2. In FIG. 4, the same members as in FIG. 1 are denoted by the same numerals and will not be described further in detail.

The projector 1002 according to Embodiment 2 has basically the same construction as the projector 1000 according to Embodiment 1, but the directions of the first optical lens and the second optical lens and the construction of the first lens array and the second lens array are different from those in the projector 1000 according to Embodiment 1, as shown in FIG. 4.

In the projector 1002 according to Embodiment 2, the first optical lens 170 and the second optical lens 180 are arranged with their concave surfaces directed toward the light incident side, as shown in FIG. 4. Thus, the focal length f3 of the superimposing system 150 can be reduced while the focal position of the superimposing system 150 is maintained.

Also, in the projector 1002 according to Embodiment 2, a lens array unit 122 is used in which a first lens array 120A and a second lens array 130A are integrally molded, as shown in FIG. 4.

The lens array unit 122 in which the first lens array 120A and the second lens array 130A are integrally molded is manufactured usually by press-molding glass. In this case, if the distance between the first lens array 120A and the second lens array 130A is long, the thickness of the lens array unit 122 increases and therefore crack or break may occur at the time of manufacturing. Also if the thickness of the lens array unit 122 increases, the weight of the lens array unit 122 increases and the material cost rises.

On the other hand, in the projector 1002 according to Embodiment 2, the focal length f3 of the superimposing system 150 can be reduced, as described above. Therefore, in the case where electro-optic modulators of a size equivalent to the traditional one are used, it is possible to reduce the focal length f1 of second small lenses 131A (and first small lenses 121A) while maintaining the length of the optical path from the superimposing lens 160 to each of the electro-optic modulators 400R, 400G, 400B and the size of the illumination area. Of course, in the case where electro-optic modulators smaller than the traditional one area used, it is possible to reduce the focal length f1 of second small lenses 131A (and first small lenses 1221A). Thus, the distance between the first lens array 120A and the second lens array 130A can be reduced and the lens array unit 122 with a reduced thickness in which the first lens array 120A and the second lens array 130A are integrally molded can be easily manufactured. Also, since the lens array unit 122 with a reduced thickness can be used for the projector 1002, the projector 1002 can be miniaturized. The weight of the lens array unit 122 can be decreased and the material cost can be reduced. Moreover, when arranging the various optical components, alignment of the first lens array 123A with the second lens array 130A need not be carried out, and after the various optical components are arranged, deterioration in the positional accuracy of the first lens array 120A and the second lens array 130A can be restrained.

Embodiment 3

FIG. 5 shows an optical system of a projector 1004 according to Embodiment 3. In FIG. 5, the same members as in FIG. 1 are denoted by the same numerals and will not be described further in detail.

The projector 1009 according to Embodiment 3 has basically the same construction as the projector 1000 according to Embodiment 1, but the directions of the first optical lens and the second optical tens and the construction of the first lens array and the second lens array are different from those in the projector 1000 according to Embodiment 1, as shown in FIG. 5.

In the projector 1004 according to Embodiment 3, the first optical lens 170 and the second optical lens 180 are arranged with their concave surfaces directed toward the light incident side, as shown in FIG. 5. Thus, the focal length f3 of the superimposing system 150 can be reduced while the focal position of the superimposing system 150 is maintained.

Also, in the projector 1004 according to Embodiment 3, a lens array unit 124 is used in which a light-transmissive member 126 for guiding light from a first lens array 120B to a second lens array 13B is provided between the first lens array 120B and the second lens array 130B, and in which the first lens array 120B and the second lens array 130B are joined with each other via the light-transmissive member 126, as shown in FIG. 5.

For miniaturization of the projector, reduction in the thickness of the light-transmissive member 126 is demanded with respect to the lens array unit 124 in which the first lens array 120B and the second lens array 130B are joined with each other via the light-transmissive member 126 as described above, in order to realize reduction in the weight of the lens array unit 124 and reduction in the material cost.

In this case, in the projector 1004 according to Embodiment 3, since the focal length f3 of the superimposing system 150 can be reduced, for the same reason as described with respect to the projector 1002 according to Embodiment 2, for example, it is possible to reduce the distance between the first lens array 120B and the second lens array 130B while maintaining the length of the optical path from the superimposing lens 160 to each of the electro-optic modulators 400R, 400G, 400B and the size of the illumination area. Therefore, it is possible to easily manufacture the lens array unit 124 having the light-transmissive member 126 with a reduced thickness. Also, since the lens array unlit 124 with a reduced thickness can be used for the projector 1004, the projector 1004 can be miniaturized and the weight of the lens array unit 124 can be reduced, thus enabling reduction in the material cost. Moreover, as the first lens array 120B and the second lens array 130B are aligned with each other in advance and then joined to the light-transmissive member 126 when arranging the various optical components, it suffices to adjust the positions of this lens array unit 124 including the first lens array 120B and the second lens array 130B and of the other optical components. Therefore, the alignment of the various optical components including this lens array unit 124 can be easily carried out, and after the various optical components are arranged, deterioration in the positional accuracy of the first lens array 120B and the second lens array 130B can be restrained.

In the projector 1004 according to Embodiment 3, the light transmissive member 126 is made of the same base material as the first lens array 120B and the second lens array 130B. That is, the light-transmissive member 126 has a refractive index equal to that of the first lens array 120B and the second lens array 130B. Also, an adhesive 128 for joining the first lens array 120B with the light-transmissive member 126 and for joining the light-transmissive member 126 with the second lens array 130B has a refractive index substantially equal to that of the first lens array 120B and the second lens array 130B.

Thus, in the projector 1004 according to Embodiment 3, reflection of light or the like on the boundary between each of the first lens array 120B and the second lens array 130B, and the light-transmissive member 126 can be restrained further. Therefore, loss in the quantity of light due to such unwanted reflection or the like can be reduced further.

Also, in the projector 1004 according to Embodiment 3, the light-transmissive member 126 has a coefficient of linear expansion equal to that of the first lens array 120B and the second lens array 130B.

Thus, in the projector 1004 according to Embodiment 3, generation of thermal stress due to temperature change caused by the use of the projector can be restrained. Therefore, damage to the junction part between each of the first lens array 120B and the second lens array 130B, and the light-transmissive member 126, can be restrained.

Embodiment 4

Figure 6:
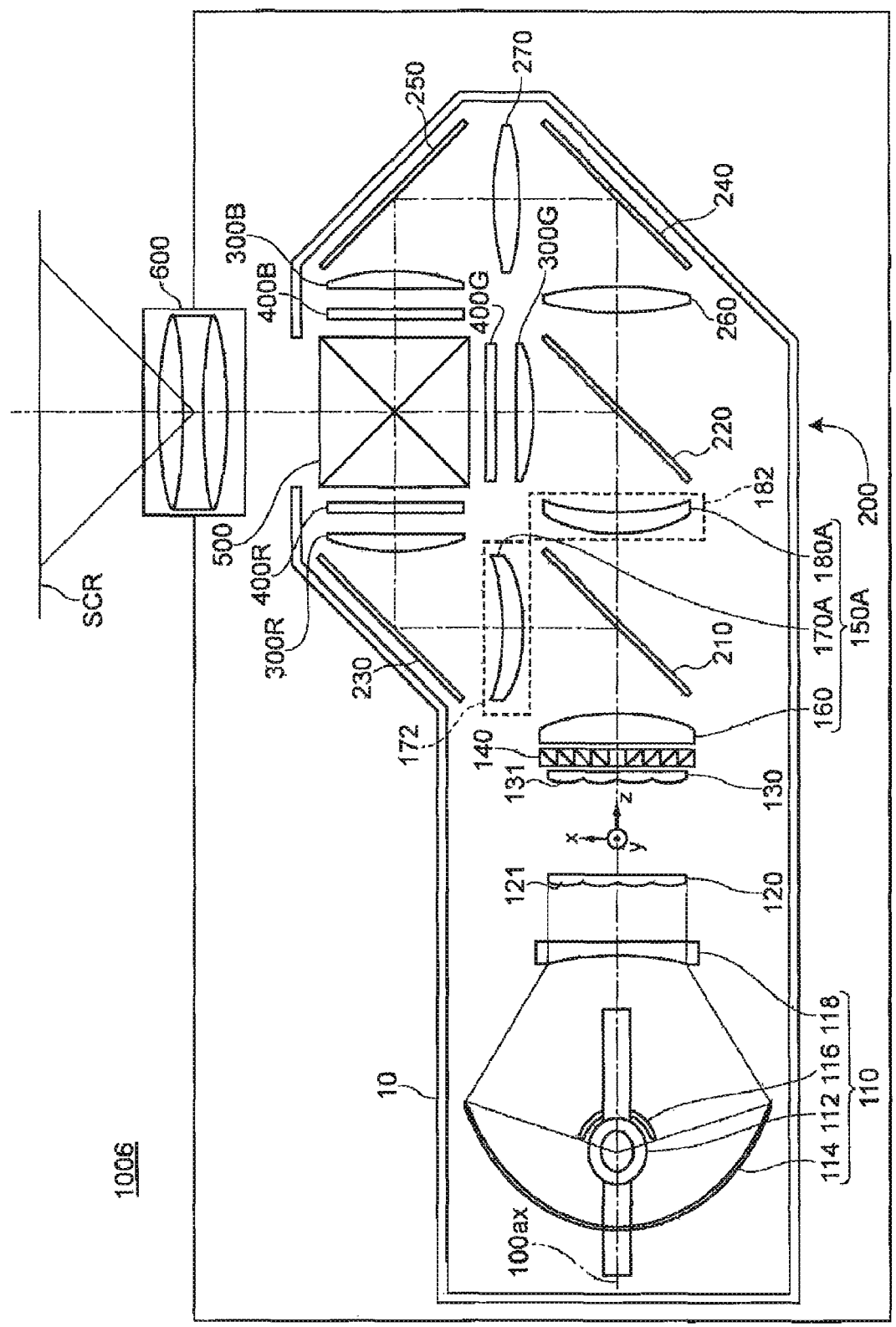
FIG. 6 shows an optical system of a projector 1006 according to Embodiment 4.

FIG. 6 shows an optical system of a projector 1006 according to Embodiment 4. In FIG. 6, the same members as in FIG. 1 are denoted by the same numerals and will not be described further in detail.

The projector 1006 according to Embodiment 4 has basically the same construction as the projector 1000 according to Embodiment 1, but the construction of the first optical lens and the second optical lens is different from that in the projector 1000 according to Embodiment 1, as shown in FIG. 6.

That is, in the projector 1000 according to Embodiment 1, the first optical lens 170 and the second optical lens 180 have the same shaper whereas in the projector 1006 according to Embodiment 4, the first optical lens 170A and the second optical lens 180A have different shapes. Specifically, the lenses are designed so that the power of the first optical lens 170A arranged in the optical path through which color light having a relatively long wavelength (that is, red light) passes is larger than the power of the second optical lens 180A arranged in the optical path through which color light having a relatively short wavelength (that is, blue light) passes.

Generally, the refractive index of a lens has a wavelength dispersion characteristic. The refractive index for light having a relatively long wavelength is smaller than the refractive index for light having a relatively short wavelength. Therefore, the light having a relatively long wavelength is more difficult to refract than the light having a relatively short wavelength. If the power of the first optical lens and the power of the second optical lens are set to be the same, the size of the illumination area cast in the image forming area tends to be different between the case where the light having a relatively long wavelength becomes incident and the case where the light having a relatively short wavelength becomes incident.

However, in such case, in the projector 1006 according to Embodiment 4, the red light passes through the first optical lens 170A of the greater power (larger refractivity) than the second optical, lens 180A. Therefore, the difficulty in refraction of the red light compared with the green light is compensated and the size of the illumination area cast in the image forming area can be the same in the case where the light having a relatively long wavelength becomes incident and in the case where the light having a relatively short wavelength becomes incident.

Thus, an illumination area of the same size is formed for each of the electro-optic modulators 400R, 400G, 400B corresponding to the respective color lights, and the illumination state of each color light becomes even. Color unevenness is reduced and color reproducibility improves.

The method for manufacturing a projector according to Embodiment 4 is a method for manufacturing the projector 1006. The method includes: preparing plural types of first optical lenses having different focal lengths as the first optical lens 170A; preparing plural types of second optical lenses having different focal lengths as the second optical lens 180A; selecting and arranging one of the plural types of first optical lenses having the different focal lengths or arranging none of the plural types of first optical lenses having the different focal lengths, thereby adjusting the focal length of the first superimposing system so that the size of the illumination area of the light emitted from the first superimposing system is adapted to the size of the image forming area in the first electro-optic modulator 400R; and selecting and arranging one of the plural types of second optical lenses having the different focal lengths or arranging none of the plural types of second optical lenses having the different focal lengths, thereby adjusting the focal length of the second superimposing system so that the size of the illumination area of the light emitted from the second superimposing system is adapted to the size of the image forming area in the second electro-optic modulator 400G and/or the third electro-optic modulator 400B.

Specifically, firsts plural types of first optical lenses and second optical lenses having different focal lengths from each other are prepared as the first optical lens 170A and the second optical lens 180A.

Next, an appropriate lens of the prepared first optical lenses is selected and arranged as the first optical lens 170A while the size of the illumination area L in the image forming area S in the electro-optic modulator 400R is confirmed. In the case where the size of the illumination area L has been adapted to the size of the image forming area S in the electro-optic modulator 400R without arranging the first optical lens 170A, the first optical lens 170A need not be arranged.

Also for the second optical lens 180A, as in the case of the first optical lens 170A, an appropriate lens of the prepared second optical lenses is selected and arranged as the second optical lens 180A while the size of the illumination area L in the image forming area S in the electro-optic modulators 400G, 400B is confirmed. In the case where the size of the illumination area L has been adapted to the size of the image forming area S in the electro-optic modulators 400G, 400B without arranging the second optical lens 180A, the second optical lens 180A need not be arranged.

Thus, the method for manufacturing a projector according to Embodiment 4 is an excellent manufacturing method that enables manufacture of a projector in which the size of the illumination area can be easily adjusted, or a projector in which even if the size of the electro-optic modulator as changed the illumination system before the change of the electro-optic modulator can be used as it is, as in the method for manufacturing a projector according to Embodiment 1.

Embodiment 5

FIG. 7 shows an optical system of a projector 1008 according to Embodiment 5. In FIG. 7, the same members as in FIG. 1 are denoted by the same numerals and will not be described furthers in detail.

The projector 1008 according to Embodiment 5 has basically the same construction as the projector 1000 according to Embodiment 1, but it is different from the projector 1000 according to Embodiment 1 in that a superimposing lens fixing device is further provided, as shown in FIG. 7.

The projector 1008 according to Embodiment 5 further has a superimposing lens fixing device 162 for removably fixing the superimposing lens 160 to the optical element housing casing 10.

Thus, in the projector 1008 according to Embodiment 5, it is possible to replace the superimposing lens 160 itself and thus to significantly adjust the size of the illumination area. As a result, the projector 1008 according to Embodiment 5 is a projector particularly suitable for the case of changing the size of the electro-optic modulators. Ink this case, the same color separation light guiding system can be used if the first optical lens and the second optical lens are changed appropriately.

The embodiments of the projector according to some aspects of the invention have been described above. However, the invention is not limited to the described embodiments and various modes can be carried out without departing from the scope of the invention. For example, the following modifications can be made.

(1) In the projectors 1000 to 1008 according to the embodiments, the case of arranging the first optical lens and the second optical lens at predetermined positions in the optical path in order to adjust the size of the illumination area is described as an example. However, the invention is not limited to this. According to the need, it suffices to arrange only the first optical lens or to arrange only the second optical lens. Also, when the size of the illumination area need not be adjusted, the first optical lens and the second optical lens need not be arranged.

(2) In the protectors 1000 to 1008 according to the embodiment, the convex meniscus lens arranged with its convex surface directed toward the light incident side is used as the optical lens However, the invention is not limited to this and an optimum optical lens can be used in combination with a superimposing lens. For example, a composite lens made up of two or more lenses can be used suitably.

(3) The method for manufacturing a projector according to each of the embodiments includes preparing plural type of optical lenses having different focal lengths as the optical lens, and adjusting the focal length of the superimposing system so that the size of the illumination area of the light emitted from the superimposing system is adapted to the image forming area in the electro-optic modulator. However, the invention is not limited to this. In the case where the size of the illumination area must be largely changed, for example, where the size of the image forming area in the electro-optic modulator is changed, it is preferable that before adjusting the focal length of the superimposing system, the method includes preparing plural types of superimposing lenses having substantially the same focal position and different focal lengths as the superimposing lens, and selecting and arranging one of the plural types of superimposing lenses having the different focal lengths as the superimposing lens, thereby roughly adjusting the focal length of the superimposing system so that the size of the illumination area of the light emitted from the superimposing lens is adapted to the size of the image forming area in the electro-optic modulator, and that in the adjustment of the focal, length of the superimposing system, the focal length of the superimposing system is finely adjusted so that the size of the illumination area or the light emitted from the superimposing system is adapted to the size of the image forming area in the electro-optic modulator.

With such a method, even when the size of the electro-optic modulator is largely chanced, the size of the illumination area generated by the superimposing system can be largely changed by replacing the superimposing lens along with the optical lens, and the size of the illumination area can be finely adjusted by the optical lens. Therefore, the illumination system before the change of the electro-optic modulator can be used as it is.

(4) The projectors 1000 to 1008 according to the embodiments are so-called three-plate projectors having three electro-optic modulators. However, the invention is not limited to this and the invention can be applied to a projector having one, two, or four or more electro-optic modulators. That is, the invention can be applied to a projector having a superimposing system that splits light from a light source into plural partial luminous fluxes and superimposes the split partial luminous fluxes on an illuminated area.

(5) The projectors 1000 to 1008 according to the embodiments are transmissive projectors. However, the invention is not limited to this and the invention can be applied to a reflective projector. Here, "transmissive" means a type such that an electro-optic modulators as a light modulator transmits light, like a transmissive electro-optic modulator or the like, whereas "reflective" means a type such that en electro-optic modulator as a light modulator reflects light, like a reflective electro-optic modulator or the like. Also when the invention is applied to a reflective projector, similar effects to those of the transmissive projector can be provided.

(6) The projectors 1000 to 1008 according to the embodiments use electro-optic modulators using liquid crystal panels, as their electro-optic modulators. However, the invention is not limited to this. Generally, any electro-optic modulator that modulates incident light in accordance with image information can be used, and micro-mirror light modulator or the like may be used. As the micro-mirror light modulator, for example, DMD (digital micro-mirror device, trademark of TI) can be used.

(7) In the projectors 1000 to 1008 according to the embodiments, the light source having the elliptic-surface reflector 114, the arc tube 112 having a luminescence center near the first focal point out the elliptic-surface reflector 114, and the concave lens 118 emitting the condensed light reflected by the elliptic-surface reflector 114 toward the first lens array 120, is used as the light source 110. However, the invention is not limited to this, and a light source having a parabolic-surface reflector and an arc tube having a luminescence center near the focal point of the parabolic-surface reflector can be used preferably.

(8) Other than these, the invention can be applied to a front projection-type projector that projects a projected image from the observing side, or a rear projection-type projector that projects a projected image from the side opposite to the observing side.

What is claimed is:

1. A projector, comprising:
   a light source that emits an illumination flux;
   a first lens array having plural first small lenses that split the illumination flux from the light source into plural partial luminous fluxes;
   a second lens array having plural second small lenses corresponding to the plural first small lenses;
   a superimposing system including a superimposing lens and an optical lens, the superimposing system superimposing each of the partial luminous fluxes from the second lens array onto an illuminated area, the superimposing lens defining a focal length and a focal position;
   an electro-optic modulator that modulates the light superimposed by the superimposing lens in accordance with image information; and
   a projection system that projects the light modulated by the electro-optic modulator,
   the optical lens disposed in an optical path between the superimposing lens and the electro-optic modulator, a focal length of the superimposing system being different than the focal length of the superimposing lens, a focal position of the superimposing system being the same as the focal position of the superimposing lens.

2. The projector as claimed in claim 1, further comprising:
   a color separation light guiding system including: a first dichroic mirror that separates light from the superimposing lens, such that first color light is separated from second color light and third color light, and a second dichroic mirror that separates the second color light from the third color light received from the first dichroic mirror;
   the electro-optic modulator including first, second and third electro-optic modulators that modulate the first, second and third color lights, respectively;
   a light combining system that combines the color lights modulated by the first, second and third electro-optic modulators, and emits the combined light to the projection system; and
   the optical lens including: a first optical lens disposed between the first dichroic mirror and the first electro-optic modulator, and a second optical lens disposed between the first dichroic mirror and the second dichroic mirror;
   the superimposing system including a first superimposing system and a second superimposing system, the first superimposing system having the superimposing lens and the first optical lens, and the second superimposing system having the superimposing lens and the second optical lens, a focal length of the first superimposing system being different than the focal length of the superimposing lens, a focal position of the first superimposing system being the same as the focal position of the superimposing lens, a focal length of the second superimposing system being different than the focal length of the superimposing lens, a focal position of the second superimposing system being the same as the focal position of the superimposing lens.

3. The projector as claimed in claim 2, at least one of the first optical lens and the second optical lens being a convex meniscus lens.

4. The projector as claimed in claim 2, at least one of the first optical lens and the second optical lens being a composite lens including at least two lenses.

5. The projector as claimed in claim 2, the first optical lens and the second optical lens having the same shape.

6. The projector as claimed in claim 2, the first optical lens and the second optical lens each including a lens, the power of the lens arranged in an optical path through which color light having a relatively long wavelength passes being larger than the power of the lens arranged in an optical path through which color light having a relatively short wavelength passes.

7. The projector as claimed in claim 1, the first lens array and the second lens array being integrated.

8. The projector as claimed in claim 1, further comprising a light-transmissive member, to guide the light from the first lens array to the second lens array, disposed between the first lens array and the second lens array, the first lens array and the second lens array being joined with each other via the light-transmissive member.

9. The projector as claimed in claim 1, the light source having an elliptic-surface reflector, an arc tube having a luminescence center near a first focal point of the elliptic-surface reflector, and a concave lens that emits converged light reflected by the elliptic-surface reflector toward the first lens array.

10. The projector as claimed in claim 9, the arc tube being provided with a reflector that reflects, toward the elliptic-surface reflector, the light emitted from the arc tube to the illuminated area side.

11. A method for manufacturing a projector that includes:
a light source that emits an illumination flux;
a first lens array having plural first small lenses that split the illumination flux from the light source into plural partial luminous fluxes;
a second lens array having plural second small lenses corresponding to the plural first small lenses;
a superimposing lens that superimposes each of the partial luminous fluxes from the second lens array onto an illuminated area, the superimposing lens defining a focal length and a focal position;
an electro-optic modulator that modulates the light superimposed by the superimposing lens in accordance with image information; and
a projection system that projects the light modulated by the electro-optic modulator;
the method comprising:
providing an optical lens by preparing plural types of optical lenses having different focal lengths, such that the optical lens and the superimposing lens form a superimposing system, a focal length of the superimposing system being different than the focal length of the superimposing lens, a focal position of the superimposing system being the same as the focal position of the superimposing lens; and selecting and arranging one of the plural types of optical lenses having the different focal lengths, or arranging none of the plural type of optical lenses having the different focal lengths, thereby adjusting the focal length of the superimposing system so that the size of an illumination area of light emitted from the superimposing system is adapted to the size of an image forming area in the electro-optic modulator.

12. The method for manufacturing a projector as claimed in claim 11, further comprising:
before adjusting the focal length of the superimposing system,
preparing plural types of superimposing lenses having a same focal position and different focal lengths as the superimposing lens; and
selecting and arranging one of the plural types of superimposing lenses having the different focal lengths, thereby roughly adjusting the focal length of the superimposing system so that the size of an illumination area of a light emitted from the superimposing lens is adapted to the size of an image forming area in the electro-optic modulator;
the adjusting of the focal length of the superimposing system including finely adjusting the focal length of the superimposing system so that the size of the illumination area of the light emitted from the superimposing system is adapted to the size of the image forming area in the electro-optic modulator.

13. The method for manufacturing a projector as claimed in claim 11, the projector including a color separation light guiding system including: a first dichroic mirror that separates light from the superimposing lens, such that first color light is separated from second color light and third color light, and a second dichroic mirror that separates the second color light from the third color light received from the first dichroic mirror, first, second and third electro-optic modulators that modulate the first, second and third color lights, respectively, and a light combining system that combines the color lights modulated by the first, second and third electro-optic modulators, and emits the combined light to the projection system, and the preparation of the plural types of optical lenses having the different focal lengths including:
providing a first optical lens by preparing plural types of first optical lenses having different focal lengths, the first optical lens and the superimposing lens being included in a first superimposing system, a focal length of the first superimposing system being different than the focal length of the superimposing lens, and focal position of the first superimposing system being the same as the focal position of the superimposing lens, and providing a second optical lens by preparing plural types of second optical lenses having different focal lengths, the second optical lens and the superimposing lens being included in a second superimposing system, a focal length of the second superimposing system being is different than the focal length of the superimposing lens, a focal position of the second superimposing system being the same as the focal position of the superimposing lens, and the adjustment of the focal length of the superimposing system including:
selecting and arranging one of the plural types of first optical lenses having the different focal lengths, or arranging none of the plural types of first optical lenses having the different focal lengths, thereby adjusting the focal length of the first superimposing system so that the size of an illumination area of light emitted from the first superimposing system is adapted to the size of an image forming area in the first electro-optic modulator, and selecting and arranging one of the plural types of second optical lenses having the different focal lengths, or arranging none of the plural types of second optical lenses having the different focal lengths, thereby adjusting the focal length of the second superimposing system so that the size of an illumination area of light emitted from the second superimposing system is adapted to the size of an image forming area in the second electro-optic modulator and/or the third electro-optic modulator.

14. The projector as claimed in claim 1, the optical lens being a convex meniscus lens.

15. The projector as claimed in claim 14, the convex meniscus lens having a convex surface facing a light incident side.

16. The projector as claimed in claim 15, the convex meniscus lens being disposed such that the focal length of the superimposing system can be increased while the focal position of the superimposing system is maintained.

17. The projector as claimed in claim 14, the convex meniscus lens having a concave surface facing a light incident side.

18. The projector as claimed in claim 17, the convex meniscus lens being reduced such that the focal length of the superimposing system can be decreased while the focal position of the superimposing system is maintained.

19. The projector as claimed in claim 3, the convex meniscus lens having a convex surface facing a light incident side, the convex meniscus lens being disposed such that the focal length of the superimposing system can be increased while the focal position of the superimposing system is maintained.

20. The projector as claimed in claim 3, the convex meniscus lens having a concave surface facing a light incident side, the convex meniscus lens being disposed such that the focal length of the superimposing system can be reduced while the focal position of the superimposing system is maintained.

* * * * *